US 8,723,802 B2

(12) United States Patent
Watanabe et al.

(10) Patent No.: US 8,723,802 B2
(45) Date of Patent: May 13, 2014

(54) MOBILE ELECTRONIC DEVICE

(75) Inventors: Kouji Watanabe, Kanagawa (JP); Yuuki Wada, Kanagawa (JP); Michiko Takei, Kanagawa (JP); Yuka Ishizuka, Kanagawa (JP); Tomoyasu Takahashi, Kanagawa (JP); Takafumi Satou, Kanagawa (JP); Masao Inadome, Kanagawa (JP); Hideko Murakami, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 241 days.

(21) Appl. No.: 13/056,642

(22) PCT Filed: Jul. 28, 2009

(86) PCT No.: PCT/JP2009/063397
§ 371 (c)(1),
(2), (4) Date: Jan. 28, 2011

(87) PCT Pub. No.: WO2010/013695
PCT Pub. Date: Feb. 4, 2010

(65) Prior Publication Data
US 2011/0175818 A1      Jul. 21, 2011

(30) Foreign Application Priority Data

Jul. 30, 2008  (JP) .................................. 2008-196452
Jul. 30, 2008  (JP) .................................. 2008-196453
Jul. 30, 2008  (JP) .................................. 2008-196454
Jul. 30, 2008  (JP) .................................. 2008-196455

(51) Int. Cl.
*G06F 3/02*      (2006.01)
*G09G 5/00*     (2006.01)
*G06F 3/048*    (2013.01)

(52) U.S. Cl.
USPC .......................................... 345/169; 715/764

(58) Field of Classification Search
USPC ............................................................ 345/172
See application file for complete search history.

(56) References Cited

U.S. PATENT DOCUMENTS 6,332,024 B1 *  12/2001  Inoue et al. ............... 379/433.06
2004/0095327 A1 *  5/2004  Lo ................................. 345/169

(Continued)

FOREIGN PATENT DOCUMENTS

JP    02-016851    1/1990
JP    10-042027    2/1998

(Continued)

OTHER PUBLICATIONS

Notice of Reasons for Rejection issued to JP Application No. 2009-283722, mailed Apr. 19, 2011.

(Continued)

*Primary Examiner* — Alexander Eisen
*Assistant Examiner* — Nan-Ying Yang
(74) *Attorney, Agent, or Firm* — Hoffmann & Baron, LLP

(57) ABSTRACT

Provided is a mobile electronic device capable of reflecting a user's intention. While an initial screen for waiting for an incoming-call is being displayed on an LCD display unit, a control unit performs control so that a first type character display area and a second type character display area are displayed on the LCD display unit in place of the initial screen, wherein the first type character display area is an area for, when any of first keys is depressed, displaying a first type character (for example, a number such as "1", "2", "3") assigned to the depressed first key and the second type character display area is an area for displaying a second type character (for example, "a", "i", "u", etc. in Japanese Hiragana letter) assigned to the depressed first key.

8 Claims, 15 Drawing Sheets

(56) References Cited

U.S. PATENT DOCUMENTS

| | | | |
|---|---|---|---|
| 2007/0266013 A1* | 11/2007 | Kang et al. | 707/3 |
| 2009/0027419 A1* | 1/2009 | Kondo et al. | 345/649 |
| 2009/0058816 A1 | 3/2009 | Takeuchi | |

FOREIGN PATENT DOCUMENTS

| | | |
|---|---|---|
| JP | 2000-041099 | 2/2000 |
| JP | 2001-331262 A | 11/2001 |
| JP | 2002-300261 | 10/2002 |
| JP | 2002-366288 | 12/2002 |
| JP | 2004-112418 A | 4/2004 |
| JP | 2005-215773 | 8/2005 |
| JP | 2005-311898 A | 11/2005 |
| JP | 2005-346462 | 12/2005 |
| JP | 2006-099449 | 4/2006 |
| JP | 2007-200243 A | 8/2007 |
| JP | 2008-118268 | 5/2008 |
| JP | 2008-520032 A | 6/2008 |
| JP | 2009059264 A | 3/2009 |
| KR | 10-2006-0046895 A | 5/2006 |
| WO | 9945459 A1 | 9/1999 |
| WO | 2006/052089 A1 | 5/2006 |
| WO | 2006052089 A1 | 5/2006 |
| WO | WO 2006052089 A1 * | 5/2006 |

OTHER PUBLICATIONS

Notice of Reasons for Rejection issued to Japanese Patent Application No. 2008-196453, mailed Jan. 10, 2012.
Notice of Reasons for Rejection issued to Japanese Patent Application No. 2008-196454, mailed Jan. 10, 2012.
Notice of Reasons for Rejection issued to Japanese Patent Application No. 2008-196455, mailed Jan. 10, 2012.
International Search Report for PCT/JP2009/063397 dated Sep. 15, 2009.
Notice of Reasons for Rejection issued to Korean Application No. 10-2011-7004370, mailed May 10, 2012.
Notice of Reasons for Rejection issued to JP Application No. 2010-285547, mailed Mar. 12, 2013.
Notice of Reasons for Rejection issued to JP Application No. 2012-070023, mailed Jan. 29, 2013.
Notice of Reasons for Rejection issued to JP Application No. 2012-100760, mailed Jan. 8, 2013.

* cited by examiner

| POSITION INFORMATION OF KEY | KEY ASSIGNMENT |
|---|---|
| ⋮ | ⋮ |
| X2, Y1 | 1 |
| X2, Y2 | 2 |
| X2, Y3 | 3 |
| X3, Y1 | 4 |
| X3, Y2 | 5 |
| X3, Y3 | 6 |
| ⋮ | ⋮ |

| POSITION INFORMATION OF KEY | NUMBER OF TIMES OF CONTINUOUS DEPRESSION | KEY ASSIGNMENT |
|---|---|---|
| ⋮ | | ⋮ |
| X2, Y1 | 1 | あ |
| | 2 | い |
| | 3 | う |
| | 4 | え |
| | 5 | お |
| | | ⋮ |

| POSITION INFORMATION OF KEY | KEY ASSIGNMENT |
|---|---|
| ⋮ | ⋮ |
| X2, Y1 | 1ch |
| X2, Y2 | 2ch |
| X2, Y3 | 3ch |
| X3, Y1 | 4ch |
| X3, Y2 | 5ch |
| X3, Y3 | 6ch |
| ⋮ | ⋮ |

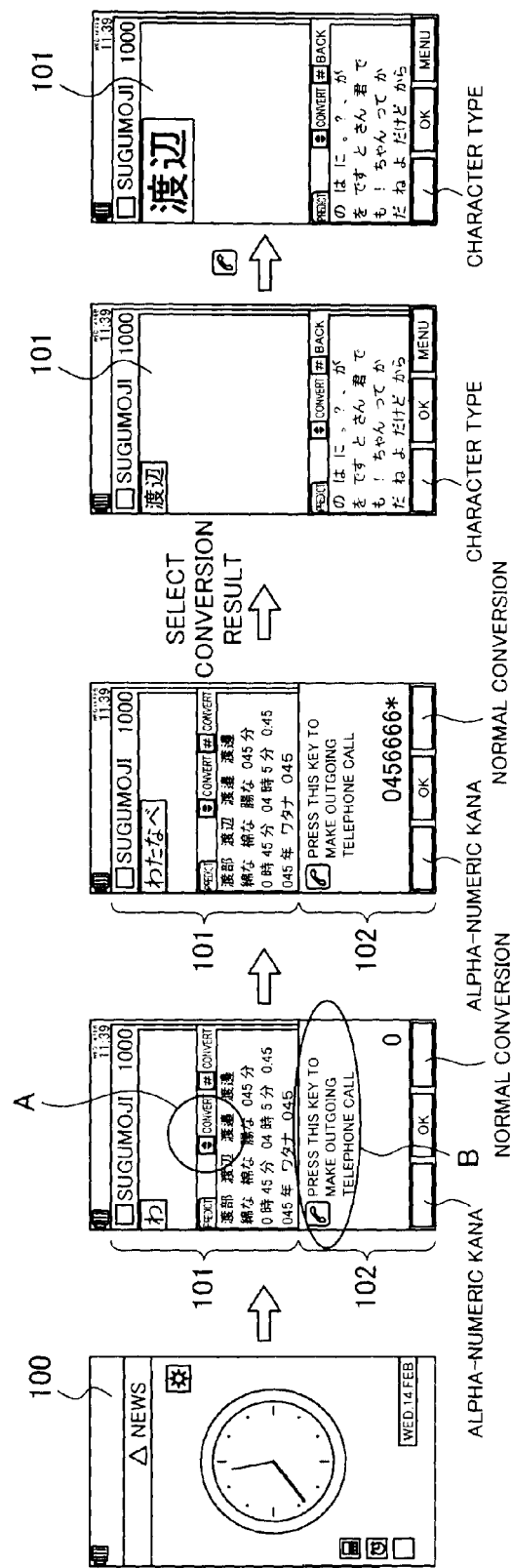

MOBILE ELECTRONIC DEVICE

CROSS-REFERENCE TO RELATED APPLICATIONS

This application is the National Stage of International Application No. PCT/JP2009/063397, filed Jul. 28, 2009, which claims the benefit of Japanese Application No. 2008-196452, filed Jul. 30, 2008, Japanese Application No. 2008-196453, filed Jul. 30, 2008, Japanese Application No. 2008-196454, filed Jul. 30, 2008, and Japanese Application No. 2008-196455, filed Jul. 30, 2008, the entire contents of all of which are incorporated by reference herein.

FIELD OF THE INVENTION

The present invention relates to a portable electronic device having an operation unit, and particularly relates to a portable electronic device in which plural types of characters are assigned to an identical key.

BACKGROUND OF THE INVENTION

A portable electronic device includes: a display unit that displays a variety of information; and an operation unit that is configured with a plurality of keys.

Here, in a portable electronic device such as a cellular telephone device, an initial screen is displayed on a display unit while waiting for an incoming call or while waiting for activation of other applications. When an operation key assigned with a numeric character is depressed in this standby state, a numeric character corresponding to the operation key thus depressed is displayed on the display unit. In addition, in the portable electronic device, for example, in a case in which an off-hook key is depressed in a state where numeric characters are displayed on the display unit, processing of an outgoing telephone call is performed based on the numeric characters that have been input, and in a case in which a key for activating a calculator (desk calculator) is depressed, a calculator application is activated in which the numeric characters that have been input are used as initial numeric values.

Moreover, a technique is proposed for a portable electronic device (for example, see Patent Document 1), in which, when a key operation is performed from an initial screen, a character corresponding to the key operation is displayed on a display unit, and when a predetermined operation (operation of depressing a key for displaying a list of applications) is performed, the list of applications corresponding to a displayed character string is displayed, and one application is selected from the list to activate the application.

Patent Document 1: Japanese Unexamined Patent Application, Publication No. 2007-200243

SUMMARY OF THE INVENTION

Problems to be Solved by the Invention

Incidentally, in the initial screen state, in a case in which the user has depressed a key that is assigned with a numeric character and non-numeric character, it is not possible to determine at an initial stage of such a key operation as to which type of character is intended by the user thus operating. As in the case of the technique of Patent Document 1, if priority is given to an input of non-numeric character, an input of a numeric character will be ignored. On the other hand, if priority is given to an input of a numeric character, an input of non-numeric character will be ignored, and there is a possibility that the user's intention is not reflected.

An object of the present invention is to provide a portable electronic device, in which, in a case in which a key operation is performed in a state where an initial screen is displayed, a plurality of characters (for example, a numeric character and non-numeric character) assigned to the key are displayed on a display unit in parallel, respectively, and one of the characters being displayed is activated by a subsequent operation, thereby making it possible to reflect the user's intention.

Means for Solving the Problems

In order to solve the abovementioned problems, a portable electronic device according to the present invention is characterized by including: a display unit; a key operation unit; and a control unit that performs control of the display unit and the key operation unit, in which the key operation unit is configured by including a plurality of first keys that are assigned with a first type character and a second type character, and when any one of the first keys is depressed in a state where an initial screen is displayed on the display unit, the control unit performs control such that the first type character assigned to the first key thus depressed and the second type character assigned to the first key thus depressed are displayed together on the display unit.

Moreover, in the portable electronic device, it is preferable that: the key operation unit is configured by including a second key, to which the first type character and the second type character are not assigned, and to which a plurality of functions are assigned, and a third key, to which the first type character and the second type character are not assigned, and to which a function different from the functions of the second key is assigned; when any one of the first keys is depressed in a state where an initial screen is displayed on the display unit, the control unit performs control such that the first type character assigned to the first key thus depressed and the second type character assigned to the first key thus depressed are displayed together on the display unit; while the control unit is performing control such that the first type character and the second type character are displayed together on the display unit, in a case in which the second key is depressed, the control unit performs first processing for the first type character, and performs control to suppress displaying of the second type character on the display unit; and while the control unit is performing control such that the first type character and the second type character are displayed together on the display unit, in a case in which the third key is depressed, the control unit performs second processing for the second type character, and performs control to suppress displaying of the first type character on the display unit.

In addition, in the portable electronic device, it is preferable that: the key operation unit is configured by including a second key, to which the first type character and the second type character are not assigned, and to which a plurality of functions are assigned, and a third key, to which the first type character and the second type character are not assigned, and to which a function different from the functions of the second key is assigned; when any one of the first keys is depressed in a state where an initial screen is displayed on the display unit, the control unit performs control such that the first type character assigned to the first key thus depressed and the second type character assigned to the first key thus depressed are displayed together on the display unit; while the control unit is performing control such that the first type character and the second type character are displayed on the display unit, in a case in which the second key is depressed, the control unit performs first processing for the first type character; while the control unit is performing control such that the first type character and the second type character are displayed on the display unit, in a case in which the third key is depressed, the control unit performs second processing for the second type character; and in the second processing, in a case in which a character string related to the second type character is a predetermined character string, the control unit performs outgoing call processing using the character string as a telephone number, and in a case in which the character string is not the predetermined character string, the control unit confirms whether outgoing call processing should be performed by using the character string as a telephone number, and performs outgoing call processing after such confirmation.

In order to solve the abovementioned problems, a portable electronic device according to the present invention is characterized by including: a display unit; a key operation unit; and a control unit that performs control of the display unit and the key operation unit, in which the key operation unit is configured by including: a first key group composed of a plurality of keys that are assigned with a first type character and a second type character, and a specific key that is assigned with a function of cancelling the first type character and the second type character that have been input via a key of the first key group; in a state where an initial screen is displayed on the display unit, in a case in which a key of the first key group is depressed, the control unit performs control such that the first type character assigned to the key thus depressed is displayed on a first type character display area, and the second type character assigned to the key thus depressed is displayed on a second type character display area; and in a case in which the specific key is depressed, the control unit performs control to cancel a character(s) equivalent to a number of times of depressing the specific key, from a character at an end of a string of the first type character, and from a character at an end of a string of the second type character.

Effects of the Invention

According to the present invention, the user's intention can be reflected in a key operation from a state where the initial screen is displayed.

BRIEF DESCRIPTION OF THE DRAWINGS

FIG. 5 is a diagram illustrating an aspect of a display state that changes from an initial screen to a split screen including a first type character display area and a second type character display area, and subsequently changes to a single screen of the first type character display area;

DETAILED DESCRIPTION OF THE INVENTION

First Embodiment

Figure 1:
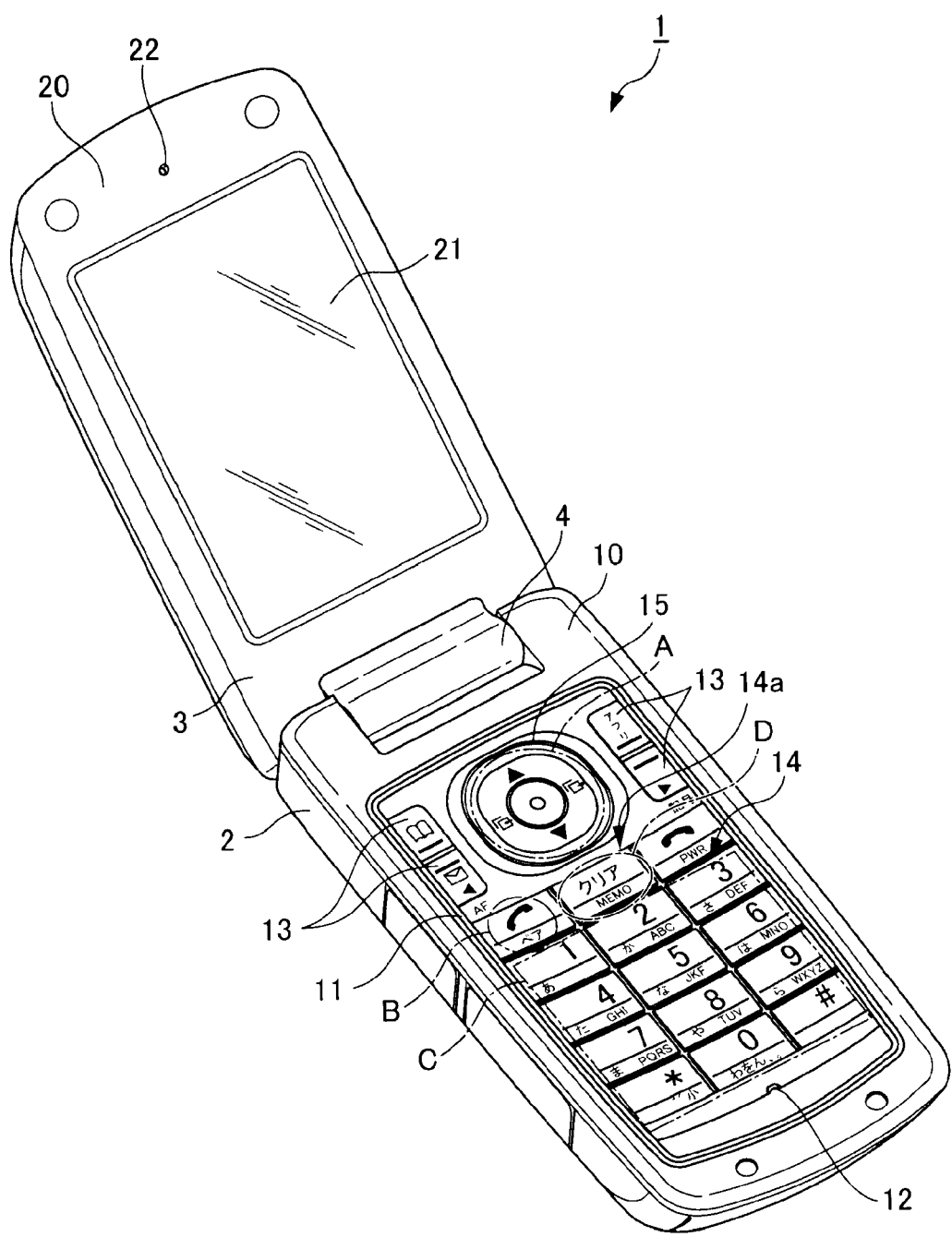
FIG. 1 is a perspective view showing an appearance of a cellular telephone device 1.

A description is provided hereinafter regarding an embodiment of the present invention. FIG. 1 is a perspective view showing an appearance of a cellular telephone device 1 as an example of the portable electronic device according to the present invention. It should be noted that, although FIG. 1 shows a so-called folder-type cellular telephone device, the cellular telephone device according to the present invention is not particularly limited thereto. For example, it may be a slider type in which one of the bodies slides to one direction in a state in which the bodies are mutually superimposed; a rotating (turning) type in which one of the bodies is rotated around an axis line along the direction of superimposing the bodies; and a type (straight type) in which an operation unit and a display unit are disposed in one body without having a connecting portion.

The cellular telephone device 1 includes an operation unit side body 2 and a display unit side body 3. The operation unit side body 2 includes, on a front face portion 10 thereof, an operation unit 11 and a microphone 12 to which sound produced by a user of the cellular telephone device 1 during a phone call is input. The operation unit 11 is configured with: function setting operation keys 13 for operating various functions such as for various settings, a telephone number directory function and a mail function; input operation keys 14 for inputting digits of a telephone number and characters for mail, etc.; and a selection operation key 15 for performing selection of the various operations and scrolling, etc.

Moreover, the display unit side body 3 includes, on a front face portion 20, an LCD (Liquid Crystal Display) display unit 21 for displaying a variety of information, and a speaker 22 for outputting sound of the other party of the conversation.

In addition, an upper end portion of the operation unit side body 2 and a lower end portion of the display unit side body 3 are connected via a hinge mechanism 4. Furthermore, the cellular telephone device 1 can be in a state where the operation unit side body 2 and the display unit side body 3 are apart from each other (opened state), and in a state where the operation unit side body 2 and the display unit side body 3 are contacting each other (folded state), as the operation unit side body 2 and the display unit side body 3, connected via the hinge mechanism 4, pivot with respect to each other.

Figure 2:
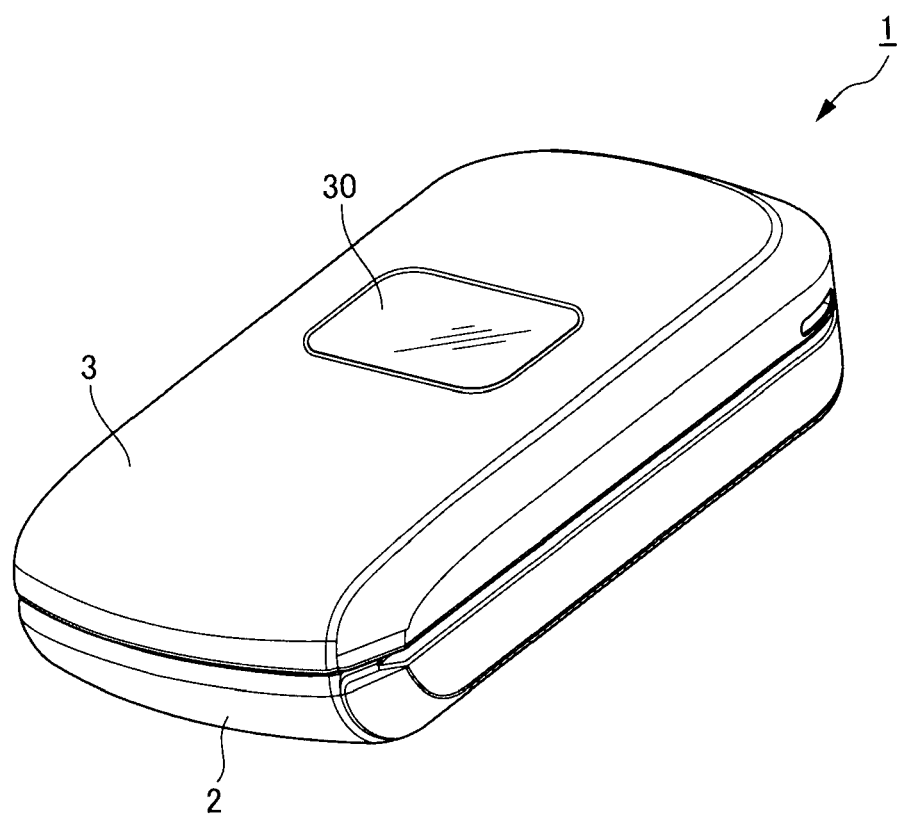
FIG. 2 is a perspective view showing a state in which the cellular telephone device 1 is folded.

Moreover, FIG. 2 is a perspective view showing a state in which the cellular telephone device 1 is folded. The operation unit side body 2 includes, on its outer planar portion, a sub LCD display unit 30 that displays a clock, incoming notice of mail, etc.

Figure 3:
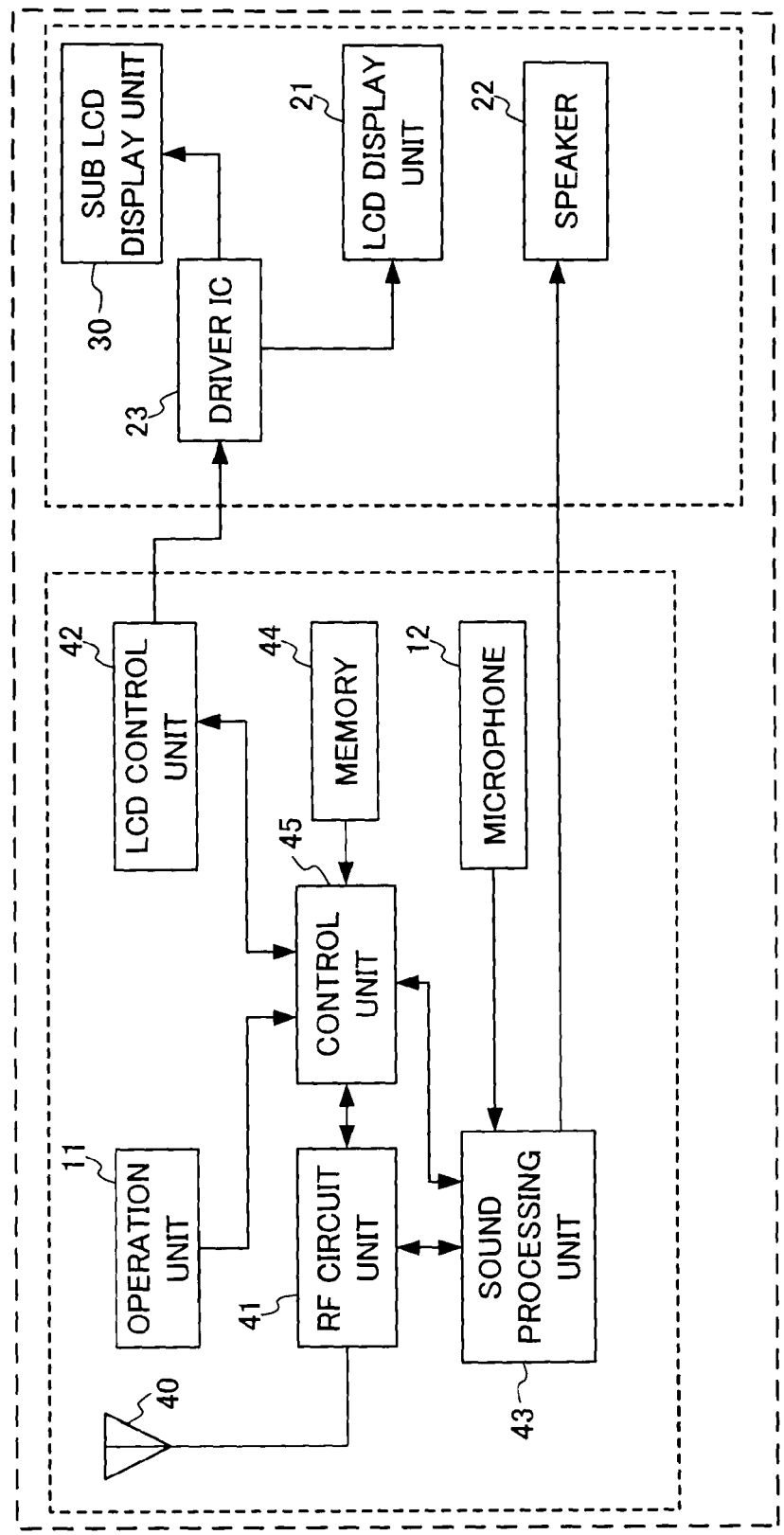
FIG. 3 is a functional block diagram showing functions of the cellular telephone device 1.

FIG. 3 is a functional block diagram showing functions of the cellular telephone device 1. In the cellular telephone device 1, as shown in FIG. 3, the operation unit side body 2 includes the operation unit (key operation unit) 11, the microphone 12, a main antenna 40, an RF circuit unit 41, an LCD control unit 42, a sound processing unit 43, memory 44, and a control unit 45. In the cellular telephone device 1, the display unit side body 3 includes the LCD display unit (display unit) 21, the speaker 22, a driver IC 23, and a sub LCD display unit 30.

The main antenna 40 communicates with a base station, etc. via a first usable frequency band (for example, 800 MHz), and is configured as a dual band compatible antenna that can be compatible with a second usable frequency band (for example, 1.5 GHz) for GPS communication. It should be noted that, although 800 MHz is set as the first usable frequency band in the present embodiment, other frequency bands can also be used. In addition, the main antenna 40 may communicate with an external device via the first usable frequency band, and another antenna that can be compatible with the second usable frequency band for GPS communication may be separately provided.

The RF circuit unit 41 performs demodulation processing of a signal received via the main antenna 40, and transmits the processed signal to the control unit 45. The RF circuit unit 41 performs modulation processing of the signal transmitted from the control unit 45, and transmits the signal to external devices (base stations) via the main antenna 40. Furthermore, on the other hand, the RF circuit unit 41 notifies the control unit 45 of intensity of a signal received via the main antenna 40.

The LCD control unit 42 performs predetermined image processing in accordance with control by the control unit 45, and outputs the processed image data to the driver IC 23. The driver IC 23 stores the image data, which is transmitted from the LCD control unit 42, in frame memory so as to be output to the LCD display unit 21 or the sub LCD display unit 30 at predetermined timing.

The sound processing unit 43 performs predetermined sound processing in accordance with control by the control unit 45 for a signal transmitted from the RF circuit unit 41, and outputs the processed signal to the speaker 22. The speaker 22 externally outputs the signal that is transmitted from the sound processing unit 43.

Moreover, the sound processing unit 43 processes a signal, which is input from the microphone 12, in accordance with control by the control unit 45, and outputs the processed signal to the RF circuit unit 41. The RF circuit unit 41 performs predetermined processing for the signal transmitted from the sound processing unit 43, and outputs the processed signal to the main antenna 40.

The memory 44 includes, for example, working memory, and is utilized for arithmetic processing by the control unit 45. In addition, the memory 44 stores a plurality of applications as well as various tables, etc. required by the applications. Furthermore, the memory 44 may also serve as detachable external memory.

The control unit 45 controls the entirety of the cellular telephone device 1, and is configured by using a central processing unit (CPU), etc. Here, a description is provided for control operations of the control unit 45 in accordance with a key operation via the operation unit 11. The control unit 45 changes characters and functions to be assigned to each key (the function setting operation keys 13, the input operation keys 14 and the selection key 15) configuring the operation unit 11, essentially in accordance with an application that is currently activated.

Figures 4A, 4B, 4C, 4D:
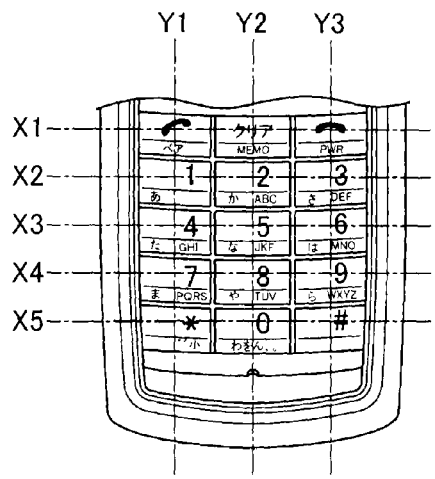
FIG. 4 is a diagram illustrating key assignment.

More specifically, when any key is depressed, the operation unit 11 transmits position information of the key to the control unit 45 (for example, as shown in FIG. 4(*a*), in a case of depressing a key in the second line and the left row among the input operation keys 14 (a key with "1" and "a" printed on its surface; ("a" is a Japanese hiragana character pronounced as "a" in the Hepburn system; hereinafter simply referred to as "a"), position information of (X2, Y1) is transmitted). The control unit 45 accesses the memory 44, refers to a key assignment table corresponding to an application that is currently activated, and performs processing of a character and a function assigned thereto, based on the position information that has been transmitted from the operation unit 11. For example, as shown in FIGS. 4(*b*) to 4(*d*), the memory 44 stores a plurality of key assignment tables. It should be noted that FIG. 4(*b*) is a table that is utilized when an outgoing telephone call is made; FIG. 4(*c*) is a table that is utilized in a memo pad application and a mail application; and FIG. 4(*d*) is a table that is utilized when changing a channel in a television application.

It should be noted that execution of processing a character means that, for example, in a case in which the currently activated application is a memo pad, then "1" or "a" is displayed on the LCD display unit 21. Moreover, execution of processing a function means that, for example, in a case in which the currently activated application is a television, the display channel is set to channel 1.

In this way, the memory 44 stores a plurality of key assignment tables. Depending on the application, the control unit 45 switches a key assignment table to be referred to, refers to a predetermined key assignment table based on position information of a key that has been transmitted from the operation unit 11, and performs predetermined processing.

The cellular telephone device 1 with such a configuration has a function, in which, in a case in which a key operation is performed in a standby state for communication, etc., a plurality of characters (for example, a numeric character and non-numeric character) assigned to the key are displayed, for example, on separate screen areas in parallel, respectively, and in a case in which a predetermined key operation is performed, a screen displaying one of the characters is activated. Moreover, the cellular telephone device 1 has a function, in which, in a case in which a predetermined key operation is performed, and when the screen displaying one of the characters is activated, a key assignment that was assigned in the screen displaying another character is changed.

Here, operations of the control unit 45 for exercising the aforementioned functions are described. In a state in which the LCD display unit 21 displays an initial screen 100 that waits for an incoming call (FIG. 5(*a*)), and when any of the first keys is depressed, the control unit 45 performs control such that the LCD display unit 21 displays, in place of the initial screen 100, a first type character display area 101 that displays first type characters (for example, Japanese hiragana characters such as those pronounced as "a", "i" and "u") assigned to the first key thus depressed, and a second type character display area 102 that displays second type characters (for example, numeric characters such as "1", "2" and "3") assigned to the first key thus depressed (FIG. 5(b)).

With such a configuration, in a case in which a key operation is performed in the standby state for communication, etc., the cellular telephone device 1 can display a plurality of characters (for example, a numeric character and non-numeric character) assigned to the key, for example, on separate screen areas in parallel, respectively; and therefore, the user's intention can be reflected.

Furthermore, the operation unit 11 is configured by including: a second key (for example, the selection operation key 15) to which the first type characters and the second type characters are not assigned, and to which a plurality of functions (for example, a function of converting kana characters into kanji characters) are assigned; and a third key (for example, an off-hook key provided to the top of the left row of the input operation keys 14), to which the first type characters and the second type characters are not assigned, and to which a function (for example, a function of making an outgoing telephone call) being different from the function of the second key is assigned. While the control unit 45 is performing control such that the first type character display area 101 and the second type character display area 102 are displayed on the LCD display unit 21, in a case in which the second key is depressed, the control unit 45 performs first processing (for example, processing to convert kana characters into kanji characters) for the first type character that has been input, and in a case in which the third key is depressed, the control unit 45 performs second processing (for example, processing related to an outgoing telephone call) for the second type character that has been input.

With such a configuration, in a case in which a key operation is performed in the standby state for communication, the cellular telephone device 1 can display a plurality of characters (for example, a numeric character and non-numeric character) assigned to the key, for example, on separate screen areas in parallel, respectively. Furthermore, when a predetermined key is depressed, processing in accordance with one screen area is performed, and thus the user's intention can be reflected. Therefore, in the cellular telephone device 1, in a standby state for communication, without causing a user to select an application in advance, a key input is enabled, the user can activate a desired application after inputting the key, and the operability can be improved.

Moreover, while the control unit 45 is performing control such that the first type character display area 101 and the second type character display area 102 are displayed on the LCD display unit 21, and in a case in which the second key is depressed, the control unit 45 performs control to notify what kind of processing is to be performed for the first type character that has been input (for example, as indicated by A in FIG. 5(b), control is performed to notify that conversion is possible by depressing an up-down key of the selection operation key 15, while showing an image printed on the surface of the selection operation key 15). In addition, in a case in which the third key is depressed, control is performed to notify what kind of processing is to be performed for the second type character that has been input (for example, as indicated by B in FIG. 5(b), control is performed to notify that an outgoing telephone call is made by depressing the off-hook key, while showing an image printed on the surface of the off-hook key).

With such a configuration, in a case in which a key operation is performed in the standby state for communication, the cellular telephone device 1 can display a plurality of characters (for example, a numeric character and non-numeric character) assigned to the key, for example, on separate screen areas in parallel, respectively. Furthermore, since notification is performed as to which key should be depressed to perform what kind of processing, it is possible to improve the convenience in the operations.

Moreover, the function that is assigned to the second key is a function of editing characters related to the first type characters displayed on the first type character display area 101 (converting a character by depressing the up-down key, determining an input character by depressing the central key, and moving the cursor by depressing the right-left key). In addition, the first processing is processing of selecting and determining, by depressing the second key, a specific character from among conversion candidates related to the first type characters displayed on the first type character display area 101. Furthermore, a function assigned to the third key is a function of making an outgoing telephone call based on characters related to the second type characters displayed on the second type character display area 102. Moreover, the second processing is processing for making an outgoing telephone call, using, as a telephone number, characters related to the second type characters displayed on the second type character display area 102 by depressing the third key.

Here, in an example shown in FIG. 5, on the initial screen 100 (FIG. 5(a)), in a case in which a key operation is performed (a key with a numeric character "0" and hiragana characters "wa, wo, n" printed on its surface), the hiragana character "wa" is displayed on the first type character display area 101 that displays the first type characters. At the same time, the numeric character "0" is displayed on the second type character display area 102 that displays the second type characters (FIG. 5(b)). As a result of sequentially performing a plurality of key operations in this way, hiragana characters spelling "watanabe" are displayed on the first type character display area 101, and numeric characters "0456666" are displayed on the second type character display area 102 (FIG. 5(c)).

In addition, in a case in which the selection operation key 15 is operated in the up-down direction when the display screen is in a state shown in FIGS. 5(b), 5(c) or the like, the control unit 45 performs processing to convert kana characters into kanji characters, and the first type character display area 101 is displayed on the entirety of the display screen (FIG. 5(d)). Furthermore, in a case in which a key (a so-called off-hook key) provided to the top of the left row of the input operation keys 14 is depressed in a state of FIG. 5(d), the control unit 45 performs processing of enlargement or the like of the displayed characters (FIG. 5(e)).

Moreover, in a case in which the key (off-hook key) provided to the top of the left row of the input operation keys 14 is depressed when the display screen is in a state of FIGS. 5(b), 5(c) or the like, the control unit 45 performs processing of making an outgoing telephone call based on a numeric character string displayed on the second type character display area 102.

In this way, from a standby state for communication, after a key operation is performed to input an arbitrary character, the control unit 45 performs control such that a different function is assigned to the off-hook key depending on whether the selection operation key 15 is depressed. Therefore, since the number of keys configuring the cellular telephone device 1 is small, the utilization efficiency of each key can be improved.

Figure 6:
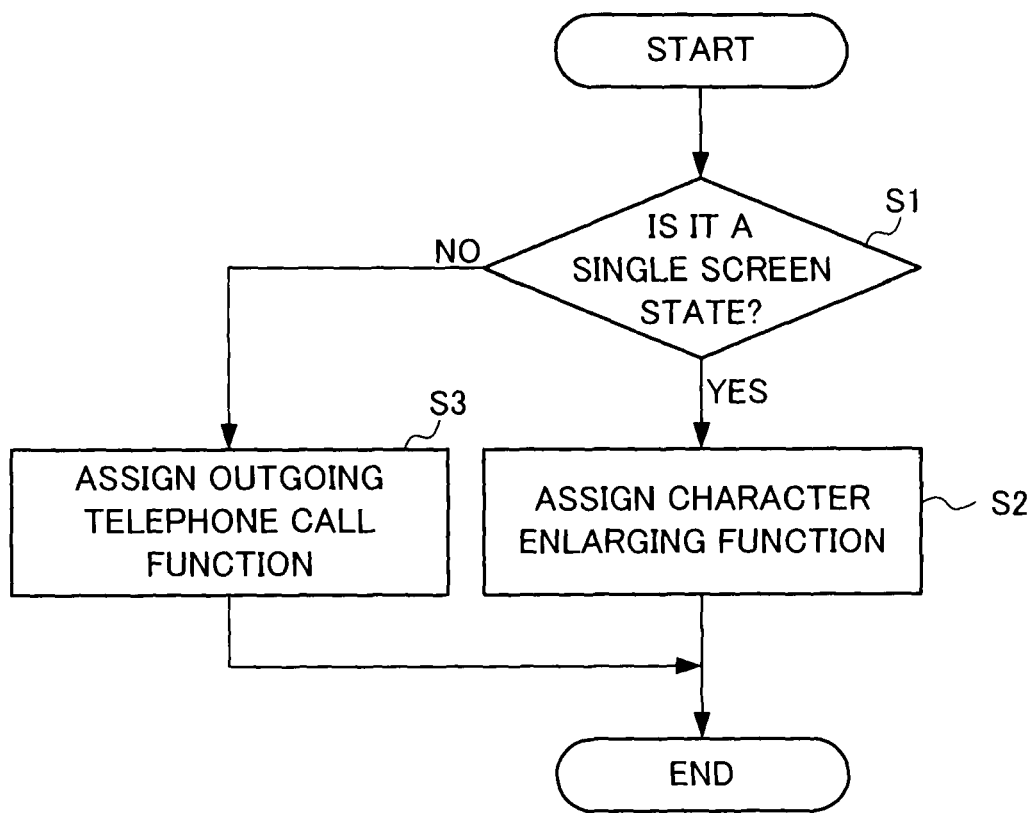
FIG. 6 is a flowchart illustrating an operation processing method performed by a control unit.

Next, a control procedure of assigning a function to the off-hook key by way of the control unit 45 is described with reference to a flowchart shown in FIG. 6. It should be noted that, in the following, a state where the first type character display area 101 and the second type character display area 102 are displayed is referred to as a state of displaying a double screen, and a state where only one screen of the first type character display area 101 or the second type character display area 102 is displayed is referred to as a state of displaying a single screen. In addition, the off-hook key is a key that is disposed to the top of the left row of the input operation keys 14.

The control unit 45 determines whether the current operating state is the state of displaying the single screen (Step S1), and in a case in which the current operating state is the state of displaying the single screen, the control unit 45 performs control such that a function of enlarging characters displayed on the first type character display area 101 is assigned to the off-hook key (Step S2). Furthermore, in a case in which the current operating state is the state of displaying the double screen, the control unit 45 performs control such that the off-hook key is assigned with a function of making an outgoing telephone call based on the numeric characters displayed on the second type character display area 102 (Step S3).

With such a configuration, in a case in which a key operation is performed in a standby state for communication, in accordance with the key operation, the cellular telephone device 1 performs control such that the first type character display area 101 and the second type character display area 102 are displayed, and notifies processing based on the character that has been input, by using an image that is the same as the image printed on the actual key. Therefore, the user's intention can be reflected, and the operability can be improved. Moreover, since the cellular telephone device 1 changes the function to be assigned to the keys in accordance with the display state of the LCD display unit 21, the utilization efficiency of the keys can be improved.

Second Embodiment

Next, operations of the control unit 45 in the cellular telephone device 1 of a second embodiment are described. It should be noted that, in describing the second embodiment, constituent elements that are the same as those of the first embodiment are assigned with the same reference symbols, and descriptions thereof are omitted or simplified. The operation unit 11 is configured by including: the first keys (for example, keys positioned from the second line to the fifth line of the input operation keys 14 indicated by C in FIG. 1); the second key (for example, the selection operation key 15); and the third key (for example, the off-hook key positioned at the top of the left row of the input operation keys 14 indicated by B in FIG. 1).

The first keys are configured with a plurality of keys, to which the first type characters (for example, hiragana characters such as "a", "i" and "u") and the second type characters (for example, numeric characters such as "1", "2" and "3") are assigned. The second key is a key, to which the first type characters and the second type characters are not assigned, and to which a plurality of functions (for example, a function of converting kana characters into kanji characters, etc.) are assigned. The third key is a key, to which the first type characters and the second type characters are not assigned, and to which a function (for example, a function of making an outgoing telephone call, etc.) being different from the function of the second key is assigned.

In a state where the LCD display unit 21 is displaying the initial screen 100 that waits for an incoming call (FIG. 7(a)), and in a case in which any one of the first keys is depressed, the control unit 45 performs control such that a first type character (for example, a hiragana character such as "a", "i" or "u") assigned to the depressed first key and a second type character (a numeric character such as "1", "2" or "3") assigned to the depressed first key are displayed together on the LCD display unit 21 (FIG. 7(b)). More specifically, the control unit 45 performs control such that, in place of the initial screen 100, the first type character is displayed on the first type character display area 101, and the second type character is displayed on the second type character display area 102.

Moreover, while the control unit 45 is performing control such that the first type character display area 101 and the second type character display area 102 are displayed on the LCD display unit 21, and in a case in which the second key is depressed, the control unit 45 performs the first processing (for example, processing to convert kana characters into kanji characters) for the first type character. In addition, the control unit 45 suppresses displaying the second type characters. Here, such suppression refers to, for example, controlling the state such that the second type character display area 102 is cancelled from the LCD display unit 21, or the first type character is visually highlighted as compared to the second type character, and in addition, processing (editing process) for the second type character is prohibited, and only processing (editing process) for the first type character is allowed.

Furthermore, while the control unit 45 is performing control such that the first type character display area 101 and the second type character display area 102 are displayed on the LCD display unit 21, and in a case in which the third key is depressed, the control unit 45 performs the second processing (for example, processing related to making an outgoing telephone call) for the second type character that has been input on the second type character display area 102. In addition, the control unit 45 suppresses displaying the first type characters. Here, such suppression refers to, for example, controlling the state such that the first type character display area 101 is cancelled from the LCD display unit 21, or the second type character is visually highlighted as compared to the first type character, and in addition, processing (editing process) for the first type character is prohibited, and only processing (editing process) for the second type character is allowed.

With such a configuration, in a case in which a key operation is performed in a standby state for communication, the cellular telephone device 1 performs control such that the first type character display area 101 and the second type character display area 102 are displayed. Therefore, in the cellular telephone device 1, both of the first type characters and the second type characters can be easily input. Furthermore, in the cellular telephone device 1, by depressing a specific key (the second key or the third key), any one of the first type character display area 101 and the second type character display area 102 is selected, predetermined processing (the first processing or the second processing) is performed, and the first type character display area 101 or the second type character display area 102, which was not selected, is cancelled from the display screen of the LCD display unit 21. Therefore, in the cellular telephone device 1, the user's operation for cancelling an unnecessary display area can be eliminated, and the user's intention can be reflected while securing the visibility.

Moreover, while the control unit 45 is performing control such that the first type character and the second type character are displayed on the LCD display unit 21, and in a case in which the second key (for example, the up-down key (character-conversion key) of the selection operation key 15) is depressed, the control unit 45 performs the first processing for the first type characters. In addition, the control unit 45 suppresses displaying the second type characters. Here, such suppression refers to, for example, controlling the state such that the second type character display area 102 is cancelled from the LCD display unit 21, or the first type character is visually highlighted as compared to the second type character, and in addition, processing (editing process) for the second type character is prohibited, and only processing (editing process) for the first type character is allowed.

Moreover, the control unit 45 changes the function assigned to the third key (for example, the function of making an outgoing telephone call based on the numeric characters displayed on the second type character display area 102) to the function of performing the third processing related to the first type characters (for example, the function of enlarging or reducing the characters displayed on the first type character display area 101).

Figure 7:
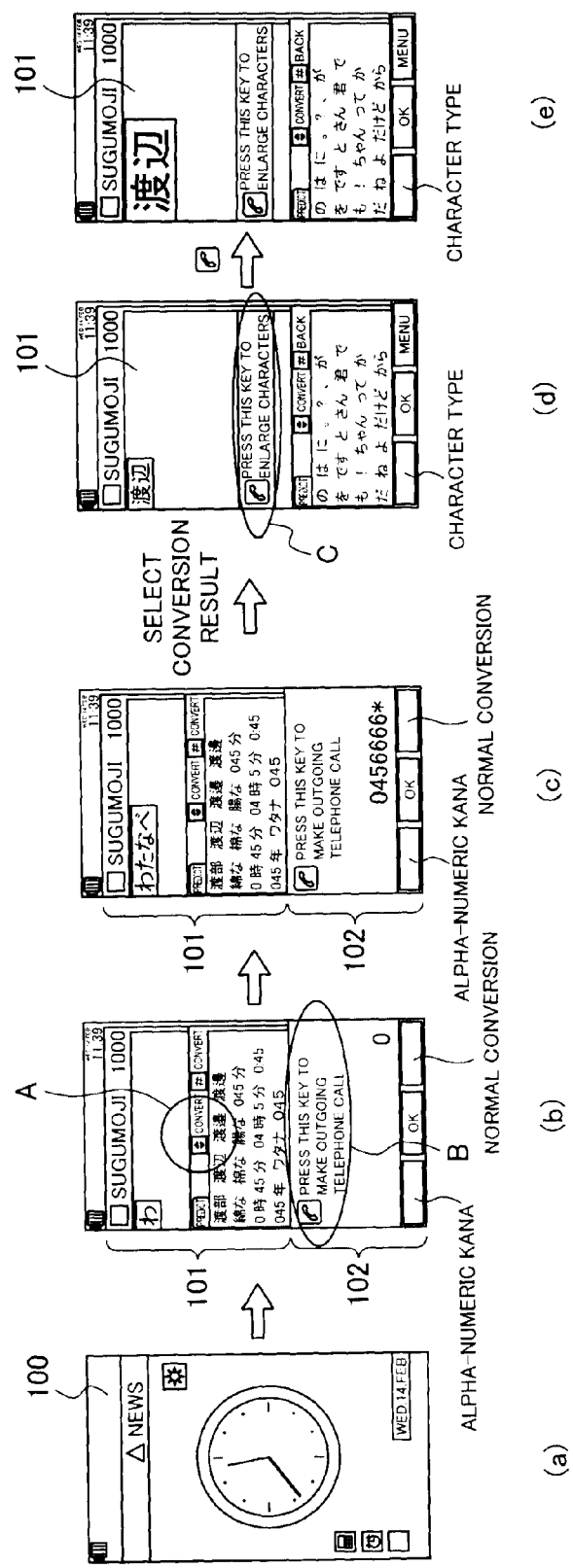
FIG. 7 is a diagram illustrating an aspect of a display state that changes from the initial screen to the split screen including the first type character display area and the second type character display area, and subsequently changes to the single screen of the first type character display area.

More specifically, in a state where a key operation is performed from the standby state for communication, in a case in which the third key is depressed while the first type character display area 101 and the second type character display area 102 are being displayed on the LCD display unit 21, the control unit 45 performs processing of making an outgoing telephone call based on the numeric characters displayed on the second type character display area 102 (see FIGS. 7(*b*) and (*c*)); and in a case in which the third key is depressed after the second type character display area 102 is cancelled from the LCD display unit 21, the control unit 45 performs processing of enlargement or reduction of the characters displayed on the first type character display area 101 (see FIG. 7(*d*)).

In this way, from a standby state for communication, after a key operation is performed to input an arbitrary character, the control unit 45 performs control such that a different function is assigned to the third key (off-hook key) depending on whether the selection operation key 15 is depressed. Therefore, since the number of keys configuring the cellular telephone device 1 is small, the utilization efficiency of the keys can be improved without increasing the number of keys.

In addition, the control unit 45 performs control such that the first type character display area 101 and the second type character display area 102 are displayed on the LCD display unit 21. Subsequently, in a case in which the second key (for example, the up-down key (character-conversion key) of the selection operation key 15) is depressed, the control unit 45 performs the first processing for the first type character that has been input on the first type character display area 101. At this time, in a case in which the third key is depressed while the display of the second type character is suppressed, the control unit 45 performs control to notify what kind of processing is to be performed for the first type character that has been input. Here, such suppression refers to, for example, controlling the state such that the second type character display area 102 is cancelled from the LCD display unit 21, or the first type character is visually highlighted as compared to the second type character, and in addition, processing (editing process) for the second type character is prohibited (inactive), and only processing (editing process) for the first type character is allowed (active). Furthermore, as indicated by C in FIG. 7(*d*), such notification control refers to, for example, performing control to notify that the characters displayed on the first type character display area 101 can be enlarged or reduced by depressing the off-hook key, while showing an image printed on the surface of the off-hook key.

With such a configuration, in a case in which the third key is depressed after the second type character display area 102 is cancelled from the LCD display unit 21, the cellular telephone device 1 notifies what kind of processing is to be performed. Therefore, the cellular telephone device 1 can improve the convenience in operations.

Moreover, the function assigned to the second key is a function of editing characters related to the first type characters (that are displayed on the first type character display area 101) (in which characters are converted by depressing the up-down key, the input characters are determined by depressing the central key, and the cursor is moved by depressing the right-left key). In addition, the first processing is processing for selecting and determining a particular character from among conversion candidates of characters related to the first type characters (that are displayed on the first type character display area 101) by depressing the second key. Furthermore, the function assigned to the third key is a function of making an outgoing telephone call based on characters related to the second type characters (that are displayed on the second type character display area 102). Moreover, the second processing is processing for making an outgoing telephone call, using, as a telephone number, characters related to the second type characters (that are displayed on the second type character display area 102) by depressing the third key.

Here, in an example shown in FIG. 7, on the initial screen (FIG. 7(*a*)), in a case in which a key (a key with a numeric character "0" and hiragana characters "wa, o, n" printed on its surface) is operated, the hiragana character "wa" is displayed on the first type character display area 101 that displays the first type characters, and at the same time, the numeric character "0" is displayed on the second type character display area 102 that displays the second type characters (FIG. 7(*b*). As a result of sequentially performing a plurality of key operations in this way, hiragana characters spelling "watanabe" are displayed on the first type character display area 101, and numeric characters "0456666" are displayed on the second type character display area 102 (FIG. 7(*c*)).

In addition, in a case in which the selection operation key 15 is operated in the up-down direction when the display screen is in a state shown in FIGS. 7(*b*), 7(*c*) or the like, the control unit 45 performs processing to convert kana characters into kanji characters. Furthermore, the first type character display area 101 is displayed on the entirety of the display screen (FIG. 7(*d*)). Moreover, in a case in which the key (the so-called off-hook key) provided to the top of the left row of the input operation keys 14 is depressed in a state of FIG. 7(*d*), the control unit 45 performs processing of enlargement or the like of the displayed characters (FIG. 7(*e*)).

In addition, in a case in which the key (off-hook key) provided to the top of the left row of the input operation keys 14 is depressed when the display screen is in a state of FIGS. 7(*b*), 7(*c*) or the like, the control unit 45 performs processing of making an outgoing telephone call based on the numeric character string displayed on the second type character display area 102.

In this way, a key operation is performed from the standby state for communication, and an arbitrary character is input; thereafter, the control unit 45 performs control to assign a different function to the off-hook key depending on whether the selection operation key 15 is depressed. Therefore, since the number of keys configuring the cellular telephone device 1 is small, the utilization efficiency of each key can be improved.

Here, in the cellular telephone device 1, in a case in which a key of the operation unit 11 with a numeric character "5" and a hiragana "na" printed on its surface is depressed once, the numeric character "5, the hiragana "na", the katakana "na" or the like are displayed as a conversion candidate on the first type character display area 101; however, rather than continuing to treat such conversion candidate display as effective information (or as being active), it is more preferable to make determination at an early stage to limit to information that is necessary for the user, i.e. to make determination of whether the display screen on which the user is intentionally inputting is the first type character display area 101 or the second type character display area 102. In this way, it is more preferable to cancel the display area on which the user is not intentionally inputting, thereby removing the processing load imposed on the control unit 45 at an early stage.

For example, in cases in which:

1. a conversion operation (depressing the second key (selection operation key 15) in the up-down direction) is performed;

2. a leftward shift or a rightward shift (depressing the second key (selection operation key 15) in the right-left direction) is performed for the input character string; or 3. the input character type is switched during the input, the cellular telephone device 1 determines that the display screen on which the user is intentionally inputting is the first type character display area 101. Moreover, the second type character display area 102 is cancelled.

Figure 8:
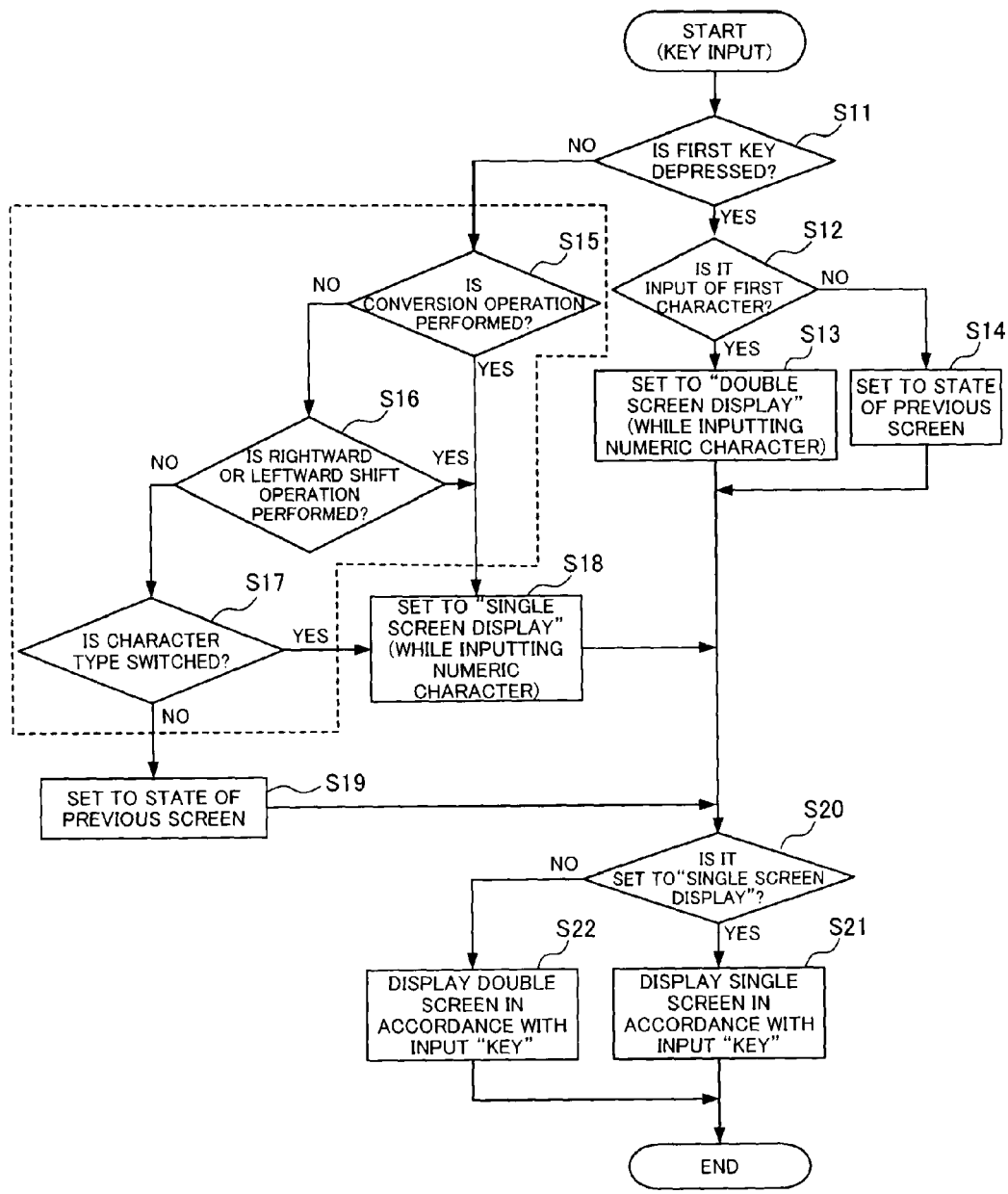
FIG. 8 is a flowchart illustrating a first operation processing method performed by the control unit.

In addition, an operation procedure of the control unit 45 for setting a state of the display screen and reflecting such setting, is described in detail with reference to a flowchart shown in FIG. 8. It should be noted that the following assumes that an input has been made by way of any key(s) configuring the operation unit 11.

In Step S11, the control unit 45 determines whether any of the first keys (keys positioned from the second to fifth lines of the input operation keys 14 indicated by C in FIG. 1) of the operation unit 11 was depressed. In a case in which it is determined that the first key is depressed (YES), the processing advances to Step 12, and in a case in which it is determined that the first key is not depressed (NO), the processing advances to Step 15.

In Step S12, the control unit 45 determines whether an input is a first character. In a case in which it is determined that the input is the first character (YES), the processing advances to Step S13, and in a case in which it is determined that the input is not the first character (NO), the processing advances to Step S14.

In Step S13, the control unit 45 performs setting of the display screen into the double screen display including the first type character display area 101 and the second type character display area 102 (setting of the double screen display).

In Step S14, the control unit 45 performs setting to maintain the display screen to be similar to the previous screen.

In Step S15, the control unit 45 determines whether a conversion operation (depressing the second key (selection operation key 15) in the up-down direction) is performed. In a case in which it is determined that the conversion operation is performed (YES), the processing advances to Step S18, and in a case in which it is determined that the conversion operation is not performed (NO), the processing advances to Step S16.

In Step S16, the control unit 45 determines whether a leftward shift operation or a rightward shift operation (depressing the second key (selection operation key 15) in the right-left direction) is performed for an input character string. In a case in which it is determined that the leftward shift operation or the rightward shift operation is performed (YES), the processing advances to Step S18, and in a case in which it is determined that the leftward shift operation or the rightward shift operation is not performed (NO), the processing advances to Step S17.

In Step S17, the control unit 45 determines whether the function setting operation key 13 is depressed to switch the type of input characters (kanji, hiragana, katakana, alphanumeric characters, etc.). In a case in which it is determined that the type of input characters is switched (YES), the processing advances to Step S18, and in a case in which it is determined that the type of input characters is not switched (NO), the processing advances to Step S19.

In Step S18, the control unit 45 performs setting of the display screen into the single screen display including only the first type character display area 101 (setting of the single screen display).

In Step S19, the control unit 45 performs setting to maintain the display screen to be similar to the previous screen.

In Step S20, the control unit 45 determines whether the set state of the display screen is the single screen display via the setting through Steps S13, S14, S18 or S19. In a case in which the set state of the display screen is the single screen setting (YES), the processing advances to Step 21, and in a case in which the set state of the display screen is not the single screen setting (NO), the processing advances to Step 22.

In Step S21, the control unit 45 performs control such that display in accordance with the input key is performed by way of the single screen display of the first type character display area 101.

Moreover, in Step S22, the control unit 45 performs control such that the double screen display of the first type character display area 101 and the second type character display area 102 is displayed in accordance with the input key.

Figure 9:
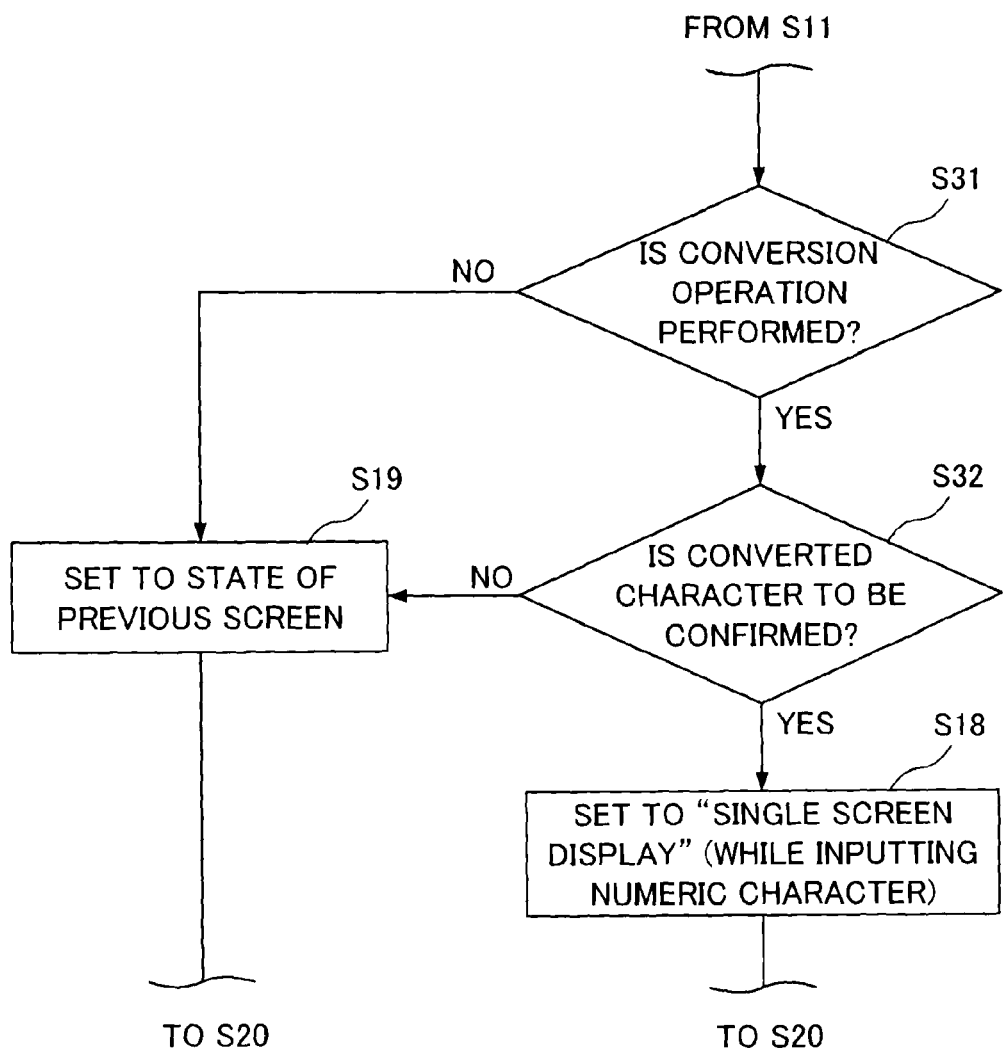
FIG. 9 is a flowchart illustrating the first operation processing method performed by the control unit.

Moreover, the procedure by way of each step is an example, and it is not limited thereto; and as shown in FIG. 9, Steps S15 to S17 particularly determines whether a conversion operation is performed (Step S31); then, in a case in which the conversion operation is performed (YES), whether a converted character should be determined is judged (Step S32), and in a case in which the converted character should be determined (YES), the processing advances to Step S18. Moreover, in a case in which the conversion operation is not performed in Step S31 (NO), or in a case in which the converted character is not determined in Step S32 (NO), the processing may be replaced with a procedure that advances to Step S19.

With such a configuration, in a case in which a key operation is performed in the standby state for communication, in response to the key operation, the cellular telephone device 1 performs control to display the first type character display area 101 and the second type character display area 102, and in response to a subsequent key input in the operation unit 11, the cellular telephone device 1 determines whether the display screen, on which the user is intentionally inputting, is the first type character display area 101 or the second type character display area 102, and cancels the display screen on which the user is not intentionally inputting. Therefore, since only a display screen on which the user is intentionally inputting is displayed, the visibility on the LCD display unit 21 can be improved, and the load on the control unit 45 can be alleviated.

In addition, in a case in which a character string is input on the first type character display area 101 and the second type character display area 102, it was necessary to continue updating all the data serving as candidates displayed on the first type character display area 101 and the second type character display area 102, until determining which display screen should be effective. However, since the determination method as described above is performed in the cellular telephone device 1, a display screen to be effective is determined at an early stage, and the double screen display is switched to the single screen display. Therefore, the visibility on the LCD display unit 21 can be improved, and the load on the control unit 45 can be alleviated.

Third Embodiment

Next, operations of the control unit 45 in the cellular telephone device 1 of a third embodiment are described. It should be noted that, in describing the third embodiment, constituent elements that are the same as those of the first and second embodiments are assigned with the same reference symbols, and descriptions thereof are omitted or simplified. The operation unit 11 is configured by including: the first keys (for example, keys positioned from the second line to the fifth line of the input operation keys 14 indicated by C in FIG. 1); the second key (for example, the selection operation key 15); and the third key (for example, the off-hook key positioned at the top of the left row line of the input operation keys 14 indicated by B in FIG. 1).

The first keys are configured with a plurality of keys, to which the first type characters (for example, hiragana characters such as "a", "i" and "u") and the second type characters (for example, numeric characters such as "1", "2" and "3") are assigned. The second key is a key, to which the first type characters and the second type characters are not assigned, and to which a single or plurality of functions (for example, a function of converting kana characters into kanji characters, etc.) are assigned. The third key is a key, to which the first type characters and the second type characters are not assigned, and to which a function (for example, a function of making an outgoing telephone call, etc.) being different from the function of the second key is assigned.

Figure 10:
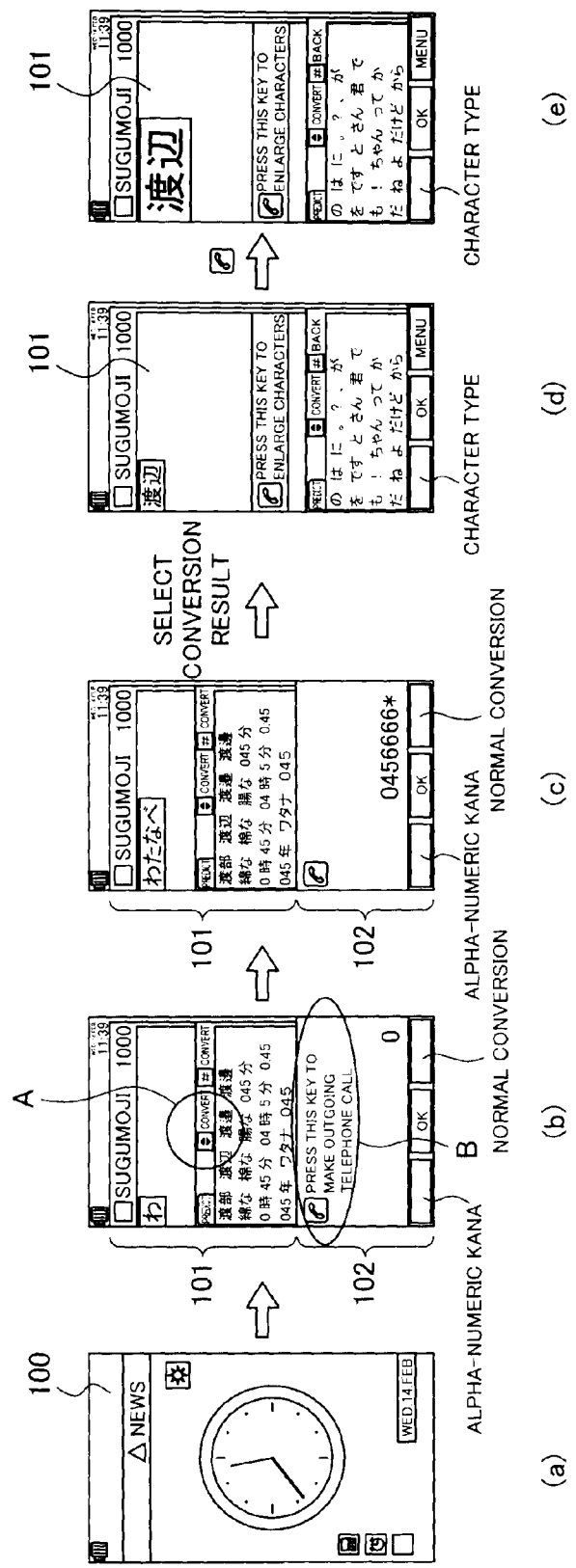
FIG. 10 is a diagram illustrating an aspect of a display state that changes from the initial screen to the split screen including the first type character display area and the second type character display area, and subsequently changes to the single screen of the first type character display area.

In a state where the LCD display unit 21 is displaying the initial screen 100 that waits for an incoming call (FIGS. 10(*a*) and 11(*a*)), and in a case in which any one of the first keys is depressed, the control unit 45 performs control such that a first type character assigned to the depressed key and a second type character assigned to the depressed key are displayed on the LCD display unit 21 (FIGS. 10(*b*), 10(*c*), 11(*b*) and 11(*c*)). More specifically, the control unit 45 performs control such that the first type character is displayed on the first type character display area 101, and the second type character is displayed on the second type character display area 102. Moreover, the first type character is a character corresponding to, for example, a hiragana character such as "a", "i" and "u". The second type character is a character corresponding to, for example, a numeric character such as "1", "2" and "3".

In addition, while the control unit 45 is performing control such that the first type character and the second type character are displayed on the LCD display unit 21, and in a case in which the second key is depressed, the control unit 45 performs the first processing (for example, processing related to converting a kana character into a kanji character) for the first type character (that has been input on the first type character display area 101).

Furthermore, while the control unit 45 is performing control to display the first type character and the second type character on the LCD display unit 21, and in a case in which the third key is depressed, the control unit 45 performs the second processing (for example, processing related to making an outgoing telephone call) for the second type character (that has been input on the second type character display area 102).

Figure 11:
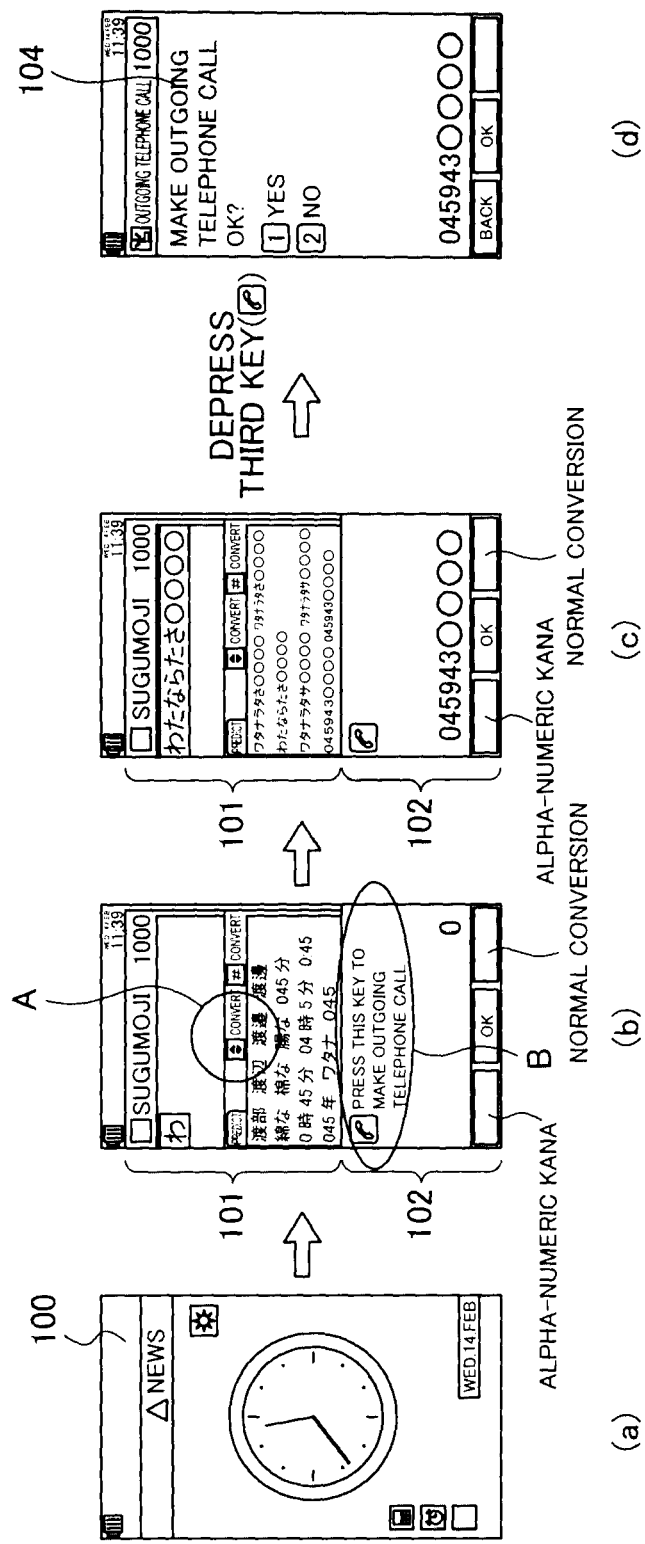
FIG. 11 is a diagram illustrating an aspect of a display state that changes from the initial screen to the split screen including the first type character display area and the second type character display area, and subsequently changes to the single screen of the second type character display area to display a confirmation display screen.

Moreover, in the second processing, in a case in which a character string related to the second type character (telephone number) (that has been input on the second type character display area 102) is a predetermined character string (telephone number), the control unit 45 performs outgoing call processing using the character string as a telephone number, and in a case in which the character string is not a predetermined character string, the control unit 45 confirms whether outgoing call processing should be performed by using the character string as a telephone number (for example, confirmation is made by displaying a confirmation display screen 104 as shown in FIG. 11(*d*)), and performs outgoing call processing after such confirmation. It should be noted that, in the confirmation display screen 104 shown in FIG. 11(*d*), in a case in which "YES" is selected, an outgoing telephone call is made based on a numeric character string "0459430000" that is being displayed, and in a case in which "NO" is selected, the screen may return to the initial screen 100, or may return to an immediately previous screen (a screen that displays the second type character display area 102 in an enlarged manner).

In addition, it is preferable that a predetermined character string is a character string (telephone number) that is registered in advance, or a character string (telephone number) for an emergency call. Furthermore, an arbitrary contact person, which is registered in an address book stored in the memory 44, may be registered as a predetermined character string. The control unit 45 refers to the memory 44 as appropriate to determine whether the character string that has been input on the second type character display area 102 is a predetermined character string.

With such a configuration, for example, in a case in which a predetermined numeric character string (telephone number) is a telephone number of your family, your close friend, etc. that is registered in advance, or is a telephone number for emergency calls (for police, fire station, emergency services, etc.), the cellular telephone device 1 immediately makes an outgoing telephone call without performing confirmation processing. On the other hand, the cellular telephone device 1 performs confirmation processing before making an outgoing telephone call for a telephone number other than such a predetermined numeric character string.

Therefore, based on an outgoing telephone number, the cellular telephone device 1 determines whether priority should be given to outgoing call processing or reducing erroneous outgoing calls, and in a case in which priority is given to the outgoing call processing, an outgoing telephone call is immediately made without performing confirmation processing. Therefore, the cellular telephone device 1 can promptly make an outgoing call in emergencies, etc. On the other hand, in a case in which priority is given to reducing erroneous outgoing calls, the cellular telephone device 1 makes an outgoing telephone call after performing confirmation processing. Therefore, the cellular telephone device 1 can reduce erroneous outgoing calls.

Here, in an example shown in FIG. 10, on the initial screen 100 (FIG. 10(*a*)), in a case in which a key (a key with a numeric character "0" and hiragana characters "wa, wo, n" printed on its surface) is operated, the hiragana character "wa" is displayed on the first type character display area 101 that displays the first type characters, and at the same time, the numeric character "0" is displayed on the second type character display area 102 that displays the second type characters (FIG. 10(*b*)). As a result of sequentially performing a plurality of key operations in this way, hiragana characters spelling "watanabe" are displayed on the first type character display area 101, and numeric characters "0456666" are displayed on the second type character display area 102 (FIG. 10(*c*)).

Moreover, in a case in which the selection operation key 15 is operated in the up-down direction when the display screen is in a state shown in FIGS. 10(*b*), 10(*c*) or the like, the control unit 45 performs processing to convert kana characters into kanji characters, and the first type character display area 101 is displayed in an enlarged manner on the display screen (FIG. 10(*d*)). In addition, in a case in which the key (the off-hook key) provided to the top of the left row of the input operation keys 14 is depressed in a state of FIG. 10(d), the control unit 45 performs processing of enlargement or the like of the displayed characters (FIG. 10(e)).

In addition, in a case in which the key (off-hook key) provided to the top of the left row of the input operation keys 14 is depressed when the display screen is in a state of FIGS. 10(b), 10(c) or the like, the control unit 45 performs processing of making an outgoing telephone call based on the numeric character string displayed on the second type character display area 102.

In this way, a key operation is performed from the standby state for communication, and an arbitrary key is input; thereafter, the control unit 45 performs control to assign a different function to the off-hook key depending on whether the selection operation key 15 is depressed. Therefore, since the number of keys configuring the cellular telephone device 1 is small, the utilization efficiency of each key can be improved.

Figure 12:
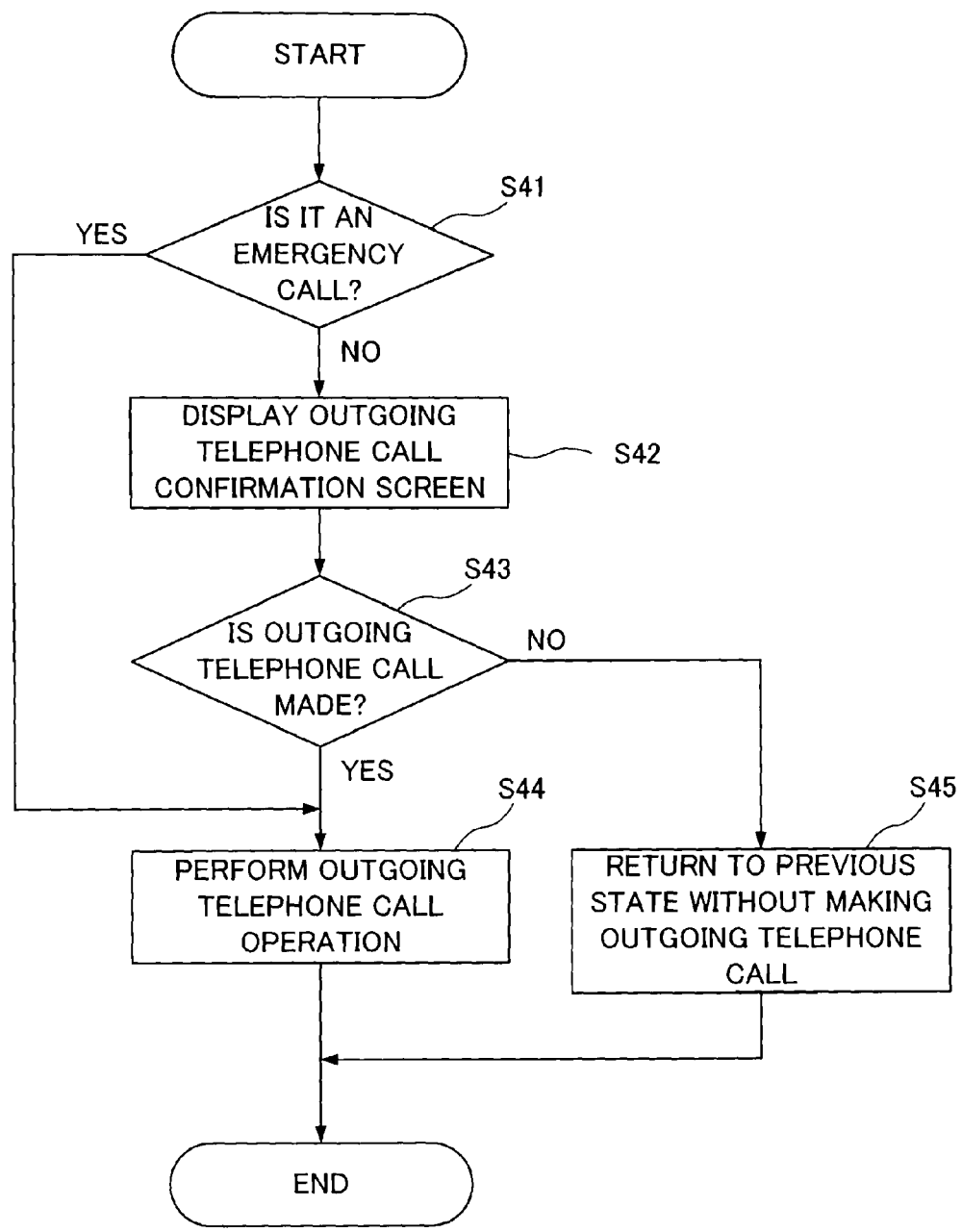
FIG. 12 is a flowchart illustrating an operation processing method performed by the control unit.

Here, with reference to a flowchart shown in FIG. 12, operations of the control unit 45 are described in detail, in a case in which an operation of an outgoing telephone call is made by depressing the third key, based on a telephone number that has been input on the second type character display area 102. It should be noted that the following assumes that an arbitrary telephone number has already been input on the second type character display area 102, and the third key has been depressed.

In Step S41, the control unit 45 determines whether a telephone number that has been input on second type character display area 102 is a predetermined telephone number (emergency call). In a case in which the telephone number that has been input on the second type character display area 102 is an emergency call (YES), the processing advances to Step S44, and in a case in which the telephone number that has been input on the second type character display area 102 is not an emergency call (NO), the processing advances to Step S42. It should be noted that, although a predetermined telephone number is an emergency call in the present embodiment, it is not limited thereto, and a predetermined telephone number may be a telephone number that is arbitrarily registered by the user. Furthermore, for example, the control unit 45 refers to an address book stored in the memory 44 to determine whether the telephone number that has been input on the second type character display area 102 is an emergency call.

In Step S42, the control unit 45 performs control such that a confirmation screen (confirmation display screen 104) is displayed on the LCD display unit 21 for confirming whether an outgoing call should be made based on a telephone number that has been input on the second type character display area 102 (see FIG. 11(d)).

In Step S43, based on the confirmation display screen 104, the control unit 45 determines whether an operation of an outgoing call has been performed. More specifically, in a case in which "1. YES" is selected on the confirmation display screen 104 shown in FIG. 11(d), the control unit 45 determines that an operation of an outgoing call has been performed, and in a case in which "2. NO" is selected on the confirmation display screen 104, the control unit 45 determines that an operation of an outgoing call has not been performed. In a case in which it is determined that an operation of an outgoing call has been performed (YES), the processing advances to Step S44, and in a case in which it is determined that an operation of an outgoing call has not been performed (NO), the processing advances to Step S45.

In Step S44, the control unit 45 performs an outgoing call operation. By way of the outgoing call operation in this step, a telephone call with another cellular telephone device is enabled via a base station.

In Step S45, the control unit 45 returns to a previous state (for example, a state in which the first type character display area 101 and the second type character display area 102 are displayed, as shown in FIG. 10(c)) without performing an outgoing call operation.

With such a configuration, in a case in which a general telephone number is input for making an outgoing telephone call, and in a case in which the third key (off-hook key) is depressed, the cellular telephone device 1 displays the confirmation display screen 104 as shown in FIG. 11(d), and does not allow an outgoing telephone call to be made unless "1. YES" is selected or "OK" is depressed. Therefore, the cellular telephone device 1 can reduce erroneous actions due to operating without watching the display screen. Moreover, the cellular telephone device 1 makes it possible to transition to a previous screen by interposing the confirmation display screen 104 as shown in FIG. 11(d). Therefore, the cellular telephone device 1 can reduce a possibility of losing data due to erroneous outgoing operations. In addition, for emergency calls (telephone numbers such as 110, 119 and 118 in Japan), the cellular telephone device 1 makes an outgoing call without displaying the confirmation display screen 104 as shown in FIG. 11(d) by considering the degree of emergency being high. Therefore, the cellular telephone device 1 can quickly cope with emergencies.

Fourth Embodiment

Next, operations of the control unit 45 in the cellular telephone device 1 of a fourth embodiment are described. It should be noted that, in describing the fourth embodiment, constituent elements that are the same as those of the first, second and third embodiments are assigned with the same reference symbols, and descriptions thereof are omitted or simplified. The cellular telephone device 1 with such a configuration has a function, in which, in a case in which a key operation is performed in the standby state for communication, a plurality of characters (for example, a numeric character and non-numeric character) assigned to the key are displayed, for example, on separate screen areas in parallel, respectively, and in a case in which a predetermined key operation is performed, a screen displaying one of the characters is activated. Moreover, in the cellular telephone device 1, when displaying different characters in separate screen areas in accordance with a key operation, the number of the characters may be different in some cases.

For example, when a key with "0" and "wa" printed on its surface is depressed, "0" is displayed on one display area, and "wa" is displayed on another display area. Subsequently, when a key with "4" and "ta" printed on its surface is depressed, "04" is displayed on one display area, and "wata" is displayed on another display area. Subsequently, when a key with "5" and "na" printed on its surface is depressed, "045" is displayed on one display area, and "watana" is displayed on another display area. Subsequently, when a key with "6" and "ha" printed on its surface is depressed four times, "0456666" is displayed on one display area, and "watanabe" is displayed on another display area. Furthermore, when a key with "*" and "(voiced sound symbol)" printed on its surface is depressed, "0456666" (in eight numeric characters) is displayed on one display area, and "watanabe" (in four hiragana characters) is displayed on another display area.

Moreover, in a case in which the number of displayed characters is different between the display areas in this way, and historical information "0456666" for the non-numeric character information "watanabe" displayed on another display area is stored in the memory, and when an operation to cancel (clear) "*" displayed on one display area is performed, the display on another display area is changed into "watanahe". Here, in a case in which the user performs a cancellation operation for the non-numeric character information, cancelling only the voiced sound symbol is considered to be rare.

Therefore, the cellular telephone device 1 has a function, in which, in a case in which a key input operation is performed in the standby state, a plurality of characters (for example, a numeric character and non-numeric character) assigned to the key are displayed, for example, on separate areas in parallel, respectively, and when a cancellation operation is subsequently performed, characters displayed on the display areas are cancelled one by one. In addition, the cellular telephone device 1 does not have history information for non-numeric character information, and has a function in which non-numeric character information is treated only as non-numeric character information, and numeric character information is treated only as numeric character information.

Here, operations of the control unit 45 for exercising the aforementioned function are described. It should be noted that the operation unit 11 is configured by including: the first key group (for example, keys positioned from the second line to the fifth line of the input operation keys 14 indicated by C in FIG. 1); a specific key 14a (for example, a clear key in the center of the first line of the input operation keys 14 indicated by D in FIG. 1); the second key (for example, the selection operation key 15); and the third key (for example, the off-hook key positioned at the top of the left row line of the input operation keys 14 indicated by B in FIG. 1).

The first key group is configured with a plurality of keys, to which the first type characters (for example, hiragana characters such as "a", "i" and "u") and the second type characters (for example, numeric characters such as "1", "2" and "3") are assigned. The specific key 14a is a key that is assigned with a function of cancelling the first type character and the second type character that have been input via a key included in the first key group. The second key is a key, to which the first type characters and the second type characters are not assigned, and to which a plurality of functions (for example, a function of converting kana characters into kanji characters, etc.) are assigned. The third key is a key, to which the first type characters and the second type characters are not assigned, and to which a function (for example, a function of making an outgoing telephone call, etc.) being different from the function of the second key is assigned.

In a state in which the LCD display unit 21 displays an initial screen 100 that waits for an incoming call, etc. (FIG. 13(a)), and when a key included in the first key group is depressed, the control unit 45 performs control such that the LCD display unit 21 displays, in place of the initial screen 100, the first type character display area 101 that displays the first type characters (for example, hiragana characters "a", "i" and "u") assigned to the depressed key, and the second type character display area 102 that displays the second type characters (for example, numeric characters such as "1", "2" and "3") assigned to the depressed key (FIG. 13 (b)).

Figure 14:
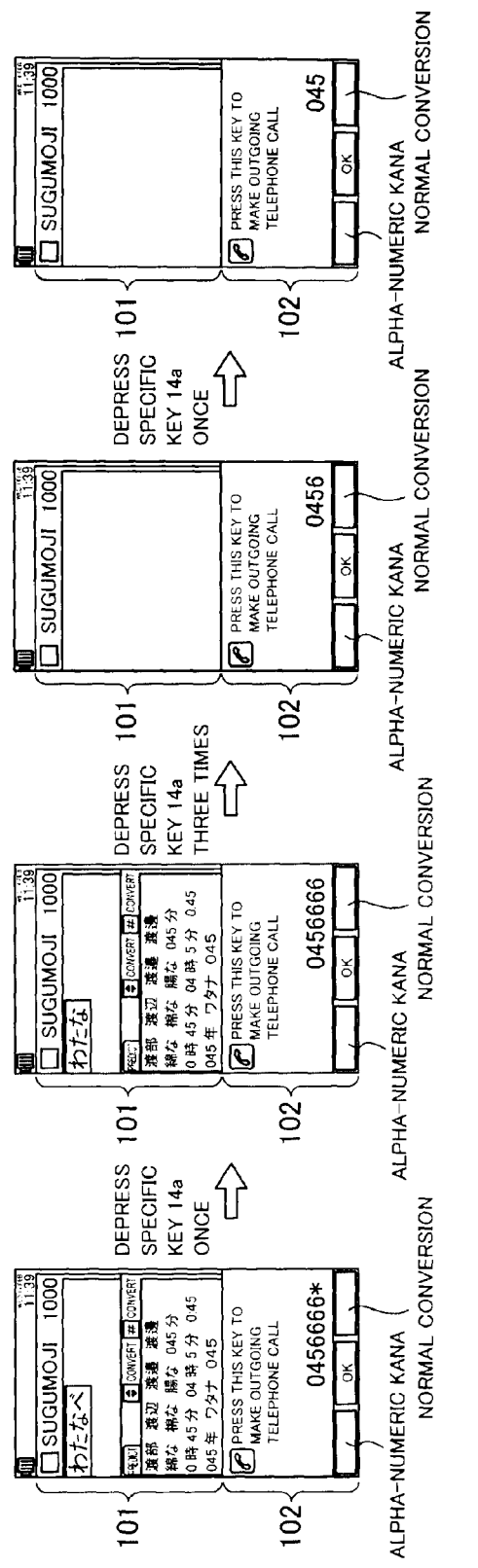
FIG. 14 is a diagram illustrating an aspect of changes of the first type character display area and the second type character display area when cancelling characters.

Furthermore, when the specific key 14a is depressed, the control unit 45 performs control to cancel characters by a number corresponding to the number of times the specific key 14a is depressed, from a character at the end of a string of the characters displayed on the first type character display area 101, and from a character at the end of a string of the characters displayed on the second type character display area 102 (FIG. 14). Here, in FIG. 14, in a state where "watanabe" is displayed on the first type character display area 101, and "045666" is displayed on the second type character display area 102 by key operations (FIG. 14(a)), by depressing the specific key 14a once, "be" on the first type character display area 101 is cancelled where "watana" remains being displayed, and "*" on the second type character display area 102 is cancelled where "045666" remains being displayed (FIG. 14(b)). Next, by consecutively depressing the specific key 14a three times, "watana" is cancelled to return to a state where no character is input on the first type character display area 101, and "66*" is cancelled where "0456" remains being displayed on the second type character display area 102 (FIG. 14(c)). Furthermore, by depressing the specific key 14a once, an un-input state is maintained on the first type character display area 101, and "6" is cancelled where "045" remains being displayed on the second type character display area 102 (FIG. 14(d)). Moreover, although not illustrated, when the specific key 14a is consecutively depressed for a predetermined period of time, all the characters displayed on the first type character display area 101 and the second type character display area 102 are cancelled.

With such a configuration, in the cellular telephone device 1, for example, when the specific key 14a is depressed only once, "be", which is at the end of the character string "watanabe" displayed on the first type character display area 101, is cancelled, and "*", which is at the end of the character string "0456666" displayed on the second type character display area 102, is cancelled. Therefore, in the cellular telephone device 1, input characters can be easily edited, and the user's intention can be reflected without imposing operational load on the user.

In addition, when characters have been input on the first type character display area 101 and the second type character display area 102 by depressing keys of the first key group, and the number of the characters that have been input on the first type character display area 101 is different from the number of the characters that have been input on the second type character display area 102, and in a case in which all the characters that have been input on any one display area of the first type character display area 101 and the second type character display area 102 are cancelled by depressing the specific key 14a, and characters still remain on another display area, the control unit 45 continues to display the first type character display area 101 and the second type character display area 102. Subsequently, in a case in which a key of the first key group is depressed, the control unit 45 displays a first type character assigned to the depressed key on the first type character display area 101, and displays a second type character assigned to the depressed key on the second type character display area 102.

With such a configuration, in the cellular telephone device 1, for example, even if the character string displayed on the first type character display area 101 is completely cancelled, as long as the numeric character string displayed on the second type character display area 102 still remains, the first type character display area 101 continues to be displayed, and in a case in which a key of the first key group is newly depressed, a first type character assigned to the depressed key is displayed on the first type character display area 101, and a second type character assigned to the depressed key is continuously displayed on the second type character display area 102. Therefore, in the cellular telephone device 1, even if characters are overly cancelled against the user's intention, characters can be input again on both of the display areas.

Furthermore, when characters have been input on the first type character display area 101 and the second type character display area 102, respectively, by depressing keys of the first key group, and the number of the characters that have been input on the first type character display area 101 is different from the number of the characters that have been input on the second type character display area 102, and in a case in which all the characters that have been input on any one display area of the first type character display area 101 and the second type character display area 102 are cancelled by depressing the specific key 14a, the control unit 45 cancels the display area with all the characters cancelled, and displays the display area with remaining characters on the entirety of the LCD display unit 21 in an enlarged manner.

With such a configuration, the cellular telephone device 1 cancels the display area with all the characters cancelled from the LCD display unit 21, and displays the display area with remaining characters in an enlarged manner on the entirety of the LCD display unit 21. The cellular telephone device 1 can improve the visibility and alleviate the processing load on the control unit 45.

Figure 13:
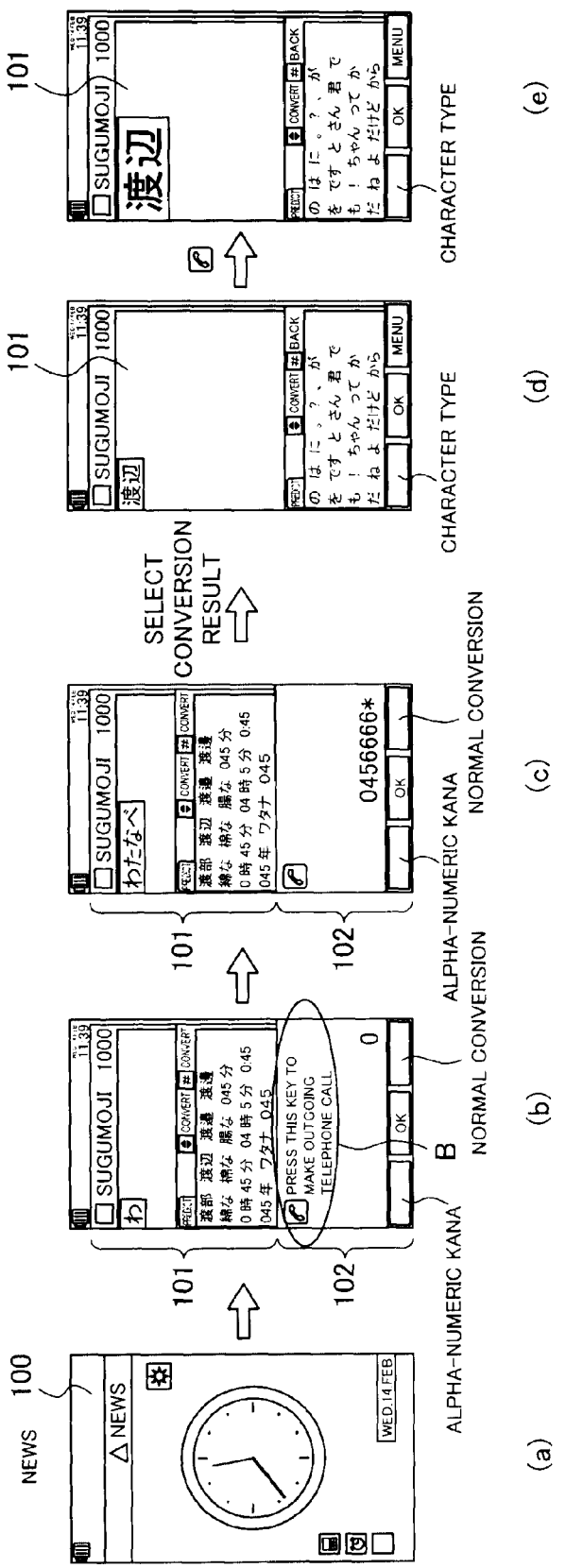
FIG. 13 is a diagram illustrating an aspect of a display state that changes from the initial screen to split areas including the first type character display area and the second type character display area, and subsequently changes to the single screen of the first type character display area.

Here, in an example shown in FIG. 13, on the initial screen (FIG. 13(a)), in a case in which a key (a key with "0" and "wa, wo, n" printed on its surface) is operated, "wa" is displayed on the first type character display area 101 that displays the first type characters, and at the same time, "0" is displayed on the second type character display area 102 that displays the second type characters (FIG. 13(b)). As a result of sequentially performing a plurality of key operations in this way, "watanabe" is displayed on the first type character display area 101, and "0456666" is displayed on the second type character display area 102 (FIG. 13(c)).

Moreover, in a case in which the selection operation key 15 is operated in the up-down direction when the display area is in a state shown in FIGS. 13(b), 13(c) or the like, the control unit 45 performs processing to convert the kana characters into kanji characters. In addition, the first type character display area 101 is displayed on the entirety of the display area (FIG. 13(d)). Furthermore, in a case in which the key (the so-called off-hook key) provided to the top of the left row of the input operation keys 14 is depressed in a state of FIG. 13(d), the control unit 45 performs processing of enlargement or the like of the displayed characters (FIG. 13(e)).

In addition, in a case in which the key (off-hook key) provided to the top of the left row of the input operation keys 14 is depressed when the display area is in a state of FIGS. 13(b), 13(c) or the like, the control unit 45 performs processing of making an outgoing telephone call based on the numeric character string displayed on the second type character display area 102.

In this way, a key operation is performed from the standby state for communication, and an arbitrary character is input; and thereafter, the control unit 45 performs control to assign a different function to the off-hook key depending on whether the selection operation key 15 is depressed. Therefore, since the number of keys configuring the cellular telephone device 1 is small, the utilization efficiency of each key can be improved.

Figure 15:
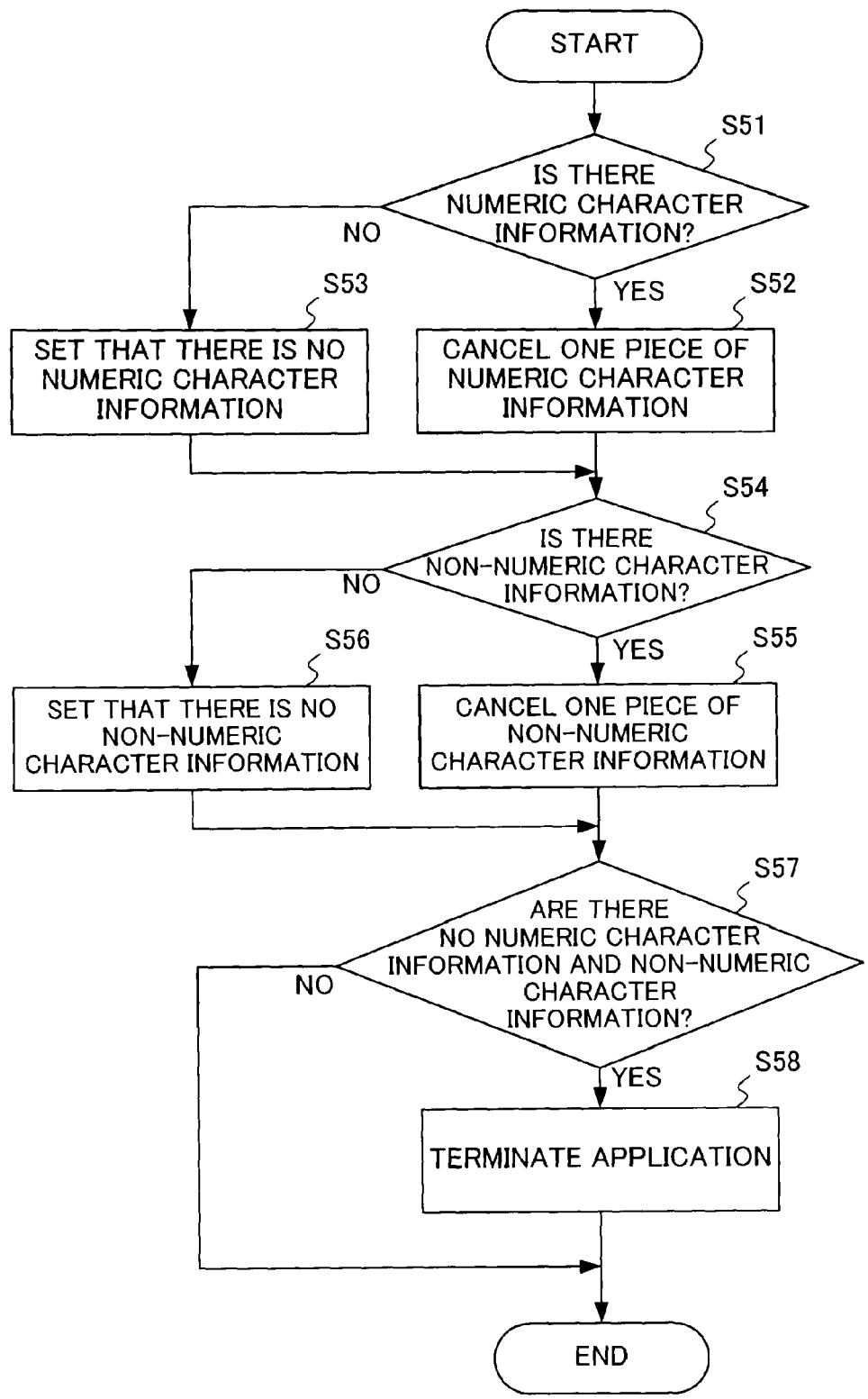
FIG. 15 is a flowchart illustrating an operation processing method performed by the control unit.

Here, a control procedure of clearing a character by way of the control unit 45 is described with reference to a flowchart shown in FIG. 15. It should be noted that the following assumes that characters have already been input on the first type character display area 101 and the second type character display area 102, and the specific key 14a has been depressed only once.

In Step S51, the control unit 45 determines whether there is numeric character information. More specifically, the control unit 45 determines whether a numeric character is displayed on the second type character display area 102. In a case in which it is determined that there is numeric character information (YES), the processing advances to Step S52, and in a case in which it is determined that there is no numeric character information (NO), the processing advances to Step S53.

In Step S52, the control unit 45 cancels one piece of the numeric character information. More specifically, the control unit 45 cancels one character from the end of the character string displayed on the second type character display area 102.

In Step S53, the control unit 45 performs setting such that there is no numeric character information.

In Step S54, the control unit 45 determines whether there is non-numeric character information. More specifically, the control unit 45 determines whether a character is displayed on the first type character display area 101. In a case in which it is determined that there is non-numeric character information (YES), the processing advances to Step S55, and in a case in which it is determined that there is no non-numeric character information (NO), the processing advances to Step S56.

In Step S55, the control unit 45 cancels one piece of the non-numeric character information. More specifically, the control unit 45 cancels one character from the end of the character string displayed on the first type character display area 101.

In Step S56, the control unit 45 performs setting such that there is no non-numeric character information.

In Step S57, the control unit 45 refers to the states that have been set in Steps S53 and S56 to determine whether it is set that there are no numeric character information and character information. In a case in which the setting is that there are no numeric character information and non-numeric character information (YES), the processing advances to Step S58, and in a case in which the setting is that there are no numeric character information and/or non-numeric character information (NO), the processing is terminated.

In Step S58, the control unit 45 performs control such that an application is terminated, i.e. the first type character display area 101 and the second type character display area are cancelled to be switched to the initial screen 100.

With such a configuration, in the cellular telephone device 1, for example, even if the character string displayed on the first type character display area 101 is completely cancelled, as long as the numeric character string displayed on the second type character display area 102 still remains, the first type character display area 101 continues to be displayed. Moreover, in the cellular telephone device 1, in a case in which a key of the first key group is newly depressed, the control unit 45 displays a first type character assigned to the depressed key on the first type character display area 101, and displays a second type character assigned to the depressed key on the second type character display area 102. Therefore, since the cellular telephone device 1 does not retain history information for non-numeric character information, the load on the memory can be alleviated.

Although the embodiments of the present invention have been described above, the present invention is not limited to the aforementioned embodiments, and can be altered as appropriate. For example, the method of key assignment shown in FIG. 4 is an example, and a method thereof is not limited to the present method.

It should be noted that, although the cellular telephone device 1 is described as a portable electronic device in the aforementioned embodiments, the present invention is not limited thereto, and the portable electronic device may be a PHS (Personal Handyphone System), a PDA (Personal Digital Assistant), a portable navigation device, a notebook PC, a mobile gaming device or the like.

EXPLANATION OF REFERENCE NUMERALS 1 cellular telephone device
11 operation unit (key operation unit)

21 LCD display unit (display unit)
44 memory
45 control unit
100 initial screen
101 first type character display area
102 second type character display area

The invention claimed is:

1. A portable electronic device, comprising:
a display unit;
a key operation unit; and
a control unit that performs control of the display unit and the key operation unit,
wherein the key operation unit includes: a plurality of first keys that are assigned with a first type character and a second type character;
a second key, to which the first type character and the second type character are not assigned, and a plurality of functions are assigned; and
a third key to which the first type character and the second type character are not assigned, and to which a function of making an outgoing telephone call based on characters related to the second type characters is assigned,
wherein, when any one of the first keys is depressed in a state where an initial screen is displayed on the display unit, the control unit performs control such that the first type character assigned to the first key thus depressed and the second type character assigned to the first key thus depressed and conversion candidates corresponding to the first type character thus entered are displayed together on the display unit,
wherein, while the control unit is performing control such that the first type character and the second type character are displayed on the display unit, in a case in which the second key is depressed, the control unit performs first processing for the first type character and performs control to notify what kind of processing is to be performed for the first type character,
wherein, while the control unit is performing control such that the first type character and the second type character are displayed on the display unit, in a case in which the third key is depressed, the control unit performs second processing for the second type character and performs control to notify what kind of processing is to be performed for the second type character,
wherein the first processing includes selecting a character from among conversion candidates related to the first type character in response to the second key being depressed in response to the second key being depressed, replacing the first type character with the selected character and cancelling displaying of the second type character in response to the second key being depressed, and
wherein the second processing includes making an outgoing telephone call using characters related to the second type character as a telephone number in response to the third key being depressed.

2. A portable electronic device, comprising:
a display unit;
a key operation unit; and
a control unit that performs control of the display unit and the key operation unit,
wherein the key operation unit comprises: a plurality of first keys that are assigned with a first type character and a second type character; a second key, to which the first type character and the second type character are not assigned, and a plurality of functions are assigned; and a third key, to which the first type character and the second type character are not assigned, and a function different from the functions of the second key is assigned,
wherein, in a state where an initial screen is displayed on the display unit, in a case in which any one of the first keys is depressed, the control unit performs control such that the first type character and the second type character assigned to the key thus depressed and conversion candidates corresponding to the first type character thus entered are displayed together on the display unit,
wherein, while the control unit is performing control such that the first type character and the second type character are displayed together on the display unit, in a case in which the second key is depressed, the control unit performs control to select and determine a specific character from among conversion candidates related to the first type character as first processing for the first type character in response to the second key being depressed, and performs control to cancel displaying of the second type character on the display unit in response to the second key being depressed, and
wherein, while the control unit is performing control such that the first type character and the second type character are displayed together on the display unit, in a case in which the third key is depressed, the control unit performs second processing for the second type character, and performs control to cancel displaying of the first type character on the display unit.

3. The portable electronic device according to claim 2, wherein, while the control unit is performing control such that the first type character and the second type character are displayed together on the display unit, in a case in which the second key is depressed, the control unit performs first processing for the first type character, performs control to cancel displaying of the second type character on the display unit, and changes a function assigned to the third key to a function of performing third processing related to the first type character.

4. The portable electronic device according to claim 2, wherein, in a case in which the third key is depressed when the control unit performs control such that first processing is performed for the first type character, and displaying of the second type character on the display unit is-cancelled, the control unit performs control to notify what kind of processing is to be performed for the first type character on which the first processing has been performed.

5. The portable electronic device according to claim 2, wherein a function assigned to the third key is a function of making an outgoing telephone call based on characters related to the second type character, and
wherein the second processing includes processing for making an outgoing telephone call using characters related to the second type character as a telephone number.

6. A portable electronic device, comprising:
a display unit;
a key operation unit; and
a control unit that performs control of the display unit and the key operation unit,
wherein the key operation unit includes: a plurality of first keys that are assigned with a first type character and a second type character; a second key, to which the first type character and the second type character are not assigned, and a plurality of functions are assigned; and a third key to which the first type character and the second type character are not assigned, and to which a function different from the functions of the second key is assigned, wherein, in a state where an initial screen is displayed on the display unit, in a case in which any one of the first keys is depressed, the control unit performs control such that the first type character and the second type character assigned to the key thus depressed and conversion candidates corresponding to the first type character thus entered are displayed together on the display unit, wherein, while the control unit is performing control such that the first type character and the second type character are displayed on the display unit, in a case in which the second key is depressed, the control unit performs first processing for the first type character, wherein, while the control unit is performing control such that the first type character and the second type character are displayed on the display unit, in a case in which the third key is depressed, the control unit performs second processing for the second type character, wherein, in the second processing, in a case in which a character string related to the second type character is a predetermined character string, the control unit performs outgoing call processing using the character string as a telephone number, and in a case in which the character string is not the predetermined character string, the control unit confirms whether outgoing call processing should be performed by using the character string as a telephone number, and performs outgoing call processing after such confirmation, and wherein the predetermined character string is a character string for an emergency call.

7. The portable electronic device according to claim 6, wherein the predetermined character string is a character string that has been registered in advance.

8. A portable electronic device, comprising:
a display unit;
a key operation unit; and
a control unit that performs control of the display unit and the key operation unit,
wherein the key operation unit is configured by including:
a first key group composed of a plurality of keys that are assigned with a first type character and a second type character, and a specific key that is assigned with a function of cancelling the first type character and the second type character that have been input via a key of the first key group, wherein, in a state where an initial screen is displayed on the display unit, in a case in which a key of the first key group is depressed, the control unit performs control such that the first type character assigned to the key thus depressed is displayed on a first type character display area, and the second type character assigned to the key thus depressed and conversion candidates corresponding to the first type character thus entered are displayed together on a second type character display area, wherein, in a case in which the specific key is depressed, the control unit performs control to cancel a character by a number corresponding to a number of times the specific key is depressed, from a character at an end of a string of the first type character, and from a character at an end of a string of the second type character, and wherein, when characters are input on the first type character display area and the second type character display area by depressing a key of the first key group, and a number of the characters that have been input on the first type character display area is different from a number of the characters that have been input on the second type character display area, in a case in which all the characters that have been input on any one display area of the first type character display area or the second type character display area are cancelled in response to the specific key being depressed, the control unit cancels the one display area on which all the characters have been cancelled in response to the specific key being depressed, and displays another display area on which characters still remain and are enlarged on the display unit in response to the specific key being depressed.

* * * * *